(12) United States Patent
Easton, Jr. et al.

(10) Patent No.: US 7,543,232 B2
(45) Date of Patent: Jun. 2, 2009

(54) INTELLIGENT WEB BASED HELP SYSTEM

(75) Inventors: Robert E. Easton, Jr., Sloatsburg, NY (US); Neal M. Keller, Hawthorne, NY (US); Juhnyoung Lee, Yorktown Heights, NY (US); Lisa M. Ungar, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 10/967,950

(22) Filed: Oct. 19, 2004

(65) Prior Publication Data
US 2006/0085750 A1    Apr. 20, 2006

(51) Int. Cl.
G06F 15/00    (2006.01)
G06F 17/00    (2006.01)
G06F 3/00     (2006.01)

(52) U.S. Cl. .................. 715/708; 715/705; 715/714
(58) Field of Classification Search ............. 715/708
See application file for complete search history.

(56) References Cited

U.S. PATENT DOCUMENTS

| | | | | |
|---|---|---|---|---|
| 5,103,498 A | * | 4/1992 | Lanier et al. | 706/58 |
| 5,701,399 A | * | 12/1997 | Lee et al. | 706/11 |
| 5,987,454 A | * | 11/1999 | Hobbs | 707/4 |
| 6,006,218 A | * | 12/1999 | Breese et al. | 707/3 |
| 6,513,036 B2 | * | 1/2003 | Fruensgaard et al. | 707/4 |
| 6,643,639 B2 | | 11/2003 | Biebesheimer et al. | |
| 6,701,311 B2 | | 3/2004 | Biebesheimer et al. | |
| 6,785,676 B2 | | 8/2004 | Oblinger | |
| 2002/0107843 A1 | | 8/2002 | Biebesheimer et al. | |
| 2002/0107852 A1 | | 8/2002 | Oblinger | |

* cited by examiner

Primary Examiner—William L Bashore
Assistant Examiner—Jordany Núñez
(74) Attorney, Agent, or Firm—Scully, Scott, Murphy & Presser, P.C.; Daniel P. Morris, Esq.

(57) ABSTRACT

A system, method and computer program product that combines techniques in the fields of search, data mining, collaborative filtering, user ratings and referral mappings into a system for intelligent web-based help for task or transaction oriented web based systems. The system makes use of a service oriented architecture based on metadata and web services to locate, categorize and provide relevant context sensitive help, including found help not available when the web based system or application was first developed. As part of the inventive system, there is additionally provided a system for providing an integrated information taxonomy which combines automatically, semi-automatically, and manually generated taxonomies and applies them to help systems. This aspect of the invention is applicable to the fields of online self-help systems for web sites and software applications as well as to customer, supplier and employee help desks.

50 Claims, 20 Drawing Sheets

12 — END USER

END USER INTERFACE  40

SEARCH HELP: — 42

[type your search keywords here][GO] — 43

SEARCH RESULTS:

Specific Help — 44

[Link 1][Current Rating][Rate this content] — 45
[Link 2][Current Rating][Rate this content]
. . .

Found Help — 46

[Link 1][Current Rating][Rate this content] — 47
[Link 2][Current Rating][Rate this content]
. . .

General Help — 48

[Link 1][Current Rating][Rate this content] — 49
[Link 2][Current Rating][Rate this content]
. . .

INTELLIGENT WEB BASED HELP SYSTEM

CROSS REFERENCE TO RELATED APPLICATIONS

The present invention relates to commonly-owned, U.S. Pat. No. 6,701,311 entitled CUSTOMER SELF SERVICE SYSTEM FOR RESOURCE SEARCH AND SELECTION; U.S. Pat. No. 6,643,639 entitled CUSTOMER SELF SERVICE SUBSYSTEM FOR ADAPTIVE INDEXING OF RESOURCE SOLUTIONS AND RESOURCE LOOKUP, and U.S. Pat. No. 6,785,676 entitled CUSTOMER SELF SERVICE SUBSYSTEM FOR RESPONSE SET ORDERING AND ANNOTATION, the whole contents and disclosure of which is incorporated by reference as if fully set forth herein. The present invention additionally relates to commonly-owned, co-pending U.S. patent application Ser. No. 09/778,378 entitled CUSTOMER SELF SERVICE SUBSYSTEM FOR CLASSIFYING USER CONTEXTS; Ser. No. 09/778,149 entitled CUSTOMER SELF SERVICE SUBSYSTEM FOR CONTEXT CLUSTER DISCOVERY AND VALIDATION, the whole contents and disclosure of each of which is incorporated by reference as if fully set forth herein.

BACKGROUND OF THE INVENTION

1. Field of the Invention

The present invention relates generally to the field of help systems and to providing self help for task or transaction oriented web based systems. More specifically, the invention relates to the use of a service oriented architecture based on metadata and web services to locate, categorize and provide relevant context sensitive help. The invention also relates to a system for providing an integrated information taxonomy which combines automatically, semi-automatically, and manually generated taxonomies and applies them to help systems.

2. Description of the Prior Art

Users of task or transaction oriented web sites are often reluctant to click on help links when performing web tasks because current web help content is often out of date, written poorly, or not relevant to the difficulty being encountered by the web user. General purpose help systems to support corporate intranets sometimes include relevant answers but are often the only help resource provided and require considerable effort on the part of the user to find the relevant answer. Hard coded help links providing specific context sensitive help written for the web page may answer the user's question but this is based on a guess by the help content author rather than actual successful experiences of users who found that this help content answered their specific question. Many Web sites provide long FAQ (Frequently Asked Questions) lists which a user must read or search through to answer their question. The growth of online peer forums for support reflects the frustration of many users with support websites and helpdesks. Users seeking specific answers need to search through a long forum or to make an append and hope for a response. Text mining tools are available to categorize and summarize these FAQ lists and forum discussions but the analysis is not mapped to specific pages in a web based application so that the user can be presented with a very short list of help resources with a high likelihood of relevance. User rating systems have been used for recommending books and other services but have not been widely used to rate help content in a way that is useful to a user needing an answer in a hurry.

As an example of current practice, help for Microsoft Word is not integrated in a portal view. The desktop and web-based help resources are separate. User context is lost when moving from one section of the help information to another. Semantic and implicit user queries are not currently supported.

Currently, there are previously disclosed techniques which monitor and analyze user behavior with a task oriented web page or workstation application in order to provide user customized contextual help, regardless of whether the user has to explicitly submit a help query or contextual help is offered without explicit user request. Other previously disclosed techniques utilize a knowledge base to provide contextual help based on a combination of user behaviors and a typed query.

Furthermore, currently available stand-alone web based portals and associated search engines navigate information spaces to discover relevant information in response to queries, analyze and categorize the information and provide it to users.

XML and its related technologies enable specifying metadata and describing web services. Other markup languages, such as SGML, provide similar capabilities.

Currently, there are also a number of previously disclosed tools for taxonomy generation which focus on the automatic generation of taxonomy from unstructured information such as text.

While such systems address various aspects of providing context sensitive user help, it would be highly desirable to provide a comprehensive end-to-end system which combines these previously disclosed techniques into a system for intelligent web-based help which is accessed from a single web link, rather than requiring the user to access the output of the various previously disclosed techniques separately. Such a system would include information that was not available when the web site was developed and would offer users a choice of help information and some indication of its value from prior use as well as the opportunity for users to impact user ratings. Such a system would be designed using a service oriented architecture so that components could be added on demand and be provided or used by various stakeholders. Such a system would include an optional taxonomy generation system that would integrate different taxonomy generation tools and different data sources, provide a multi-dimensional taxonomy, and would be applicable to providing integrated user help.

SUMMARY OF THE INVENTION

The present invention is directed to a system, method and computer program product that combines techniques in the fields of search, data mining, collaborative filtering, user ratings and referral mappings into a system for intelligent web-based help for task or transaction oriented web based systems which is accessed from a single web link.

More specifically, the invention relates to the use of a service oriented architecture based on XML metadata and web services to locate, categorize and provide relevant context sensitive help, including found help not available when the web based system or application was first developed. As part of the inventive system, there is additionally provided a system for providing an integrated information taxonomy which combines automatically, semi-automatically, and manually generated taxonomies and applies them to help systems. This aspect of the invention is applicable to the fields of online self-help systems for web sites and software applications as well as to customer, supplier and employee help desks.

Thus, the invention provides meaningful context sensitive help for Web applications and encourages the writing of better help material. Often the help content for a Web site is generated last. Being an open market help system—the invention offers various levels of help depending on available content. This invention brings together two worlds—combining relevancy ranking of unstructured information with the precise nature of database queries, and applies it to providing improved help information.

According to a first aspect of the invention, there is provided a comprehensive end-to-end system which combines a number of previously disclosed techniques into a system for intelligent web-based help which is accessed from a single web link, rather than requiring the user to access the output of the various previously disclosed techniques separately. Such a system is adapted to find help information that was not available when the web site was developed and offers users a choice of help information in addition to some indication of its value from prior use as well as the opportunity for users to impact user ratings. Such a system is designed to implement a service oriented architecture so that components could be added on-demand and be provided or used by various stakeholders. The system includes an optional taxonomy generation system that integrates different taxonomy generation tools and different data sources, and provides a multi-dimensional taxonomy applicable to providing integrated user help. While there are a number of available tools for taxonomy generation, these tools focus on the automatic generation of taxonomy from unstructured information such as text. The system of the invention assumes the use of such tools for culling taxonomical information from unstructured information, however, provides taxonomy integrated from not only unstructured information sources, but additionally structured and semi-structured information, by using transformation tools and taxonomy integration tools.

According to a further aspect of the invention, there is provided an on-demand, context-sensitive, integrated help system which applies service oriented architecture and technologies to provide help content to end users based on negotiated service level agreements, e.g., between sponsors and service provider entities. This system integrates structured, semi-structured, and unstructured help information, categorizes the help information into general, specific and found categories, and provides the help content to the user via a discovered or sponsor provided help taxonomy. This system can, depending on sponsor specified parameters, include the addition of found help from unstructured content which was written after the release of the software which represents the domain of the help content.

Thus, the present invention is different from the Web-portals and search engines in several aspects. Most of all, unlike web search engines which often exist stand-alone, the system is adapted to be embedded in applications to provide application users with on-demand, context-sensitive help information by tracking user contexts.

Advantageously, the invention is applicable to the fields of online self-help systems for web sites and software applications as well as to customer, supplier and employee help desks. The technical infrastructure and system components provide intelligent web-based help, particularly from the convenience of a single "Help" button or single web link, rather than requiring a user to access the output of the various disclosed techniques in the fields of search, data mining, collaborative filtering, user ratings and referral mappings.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
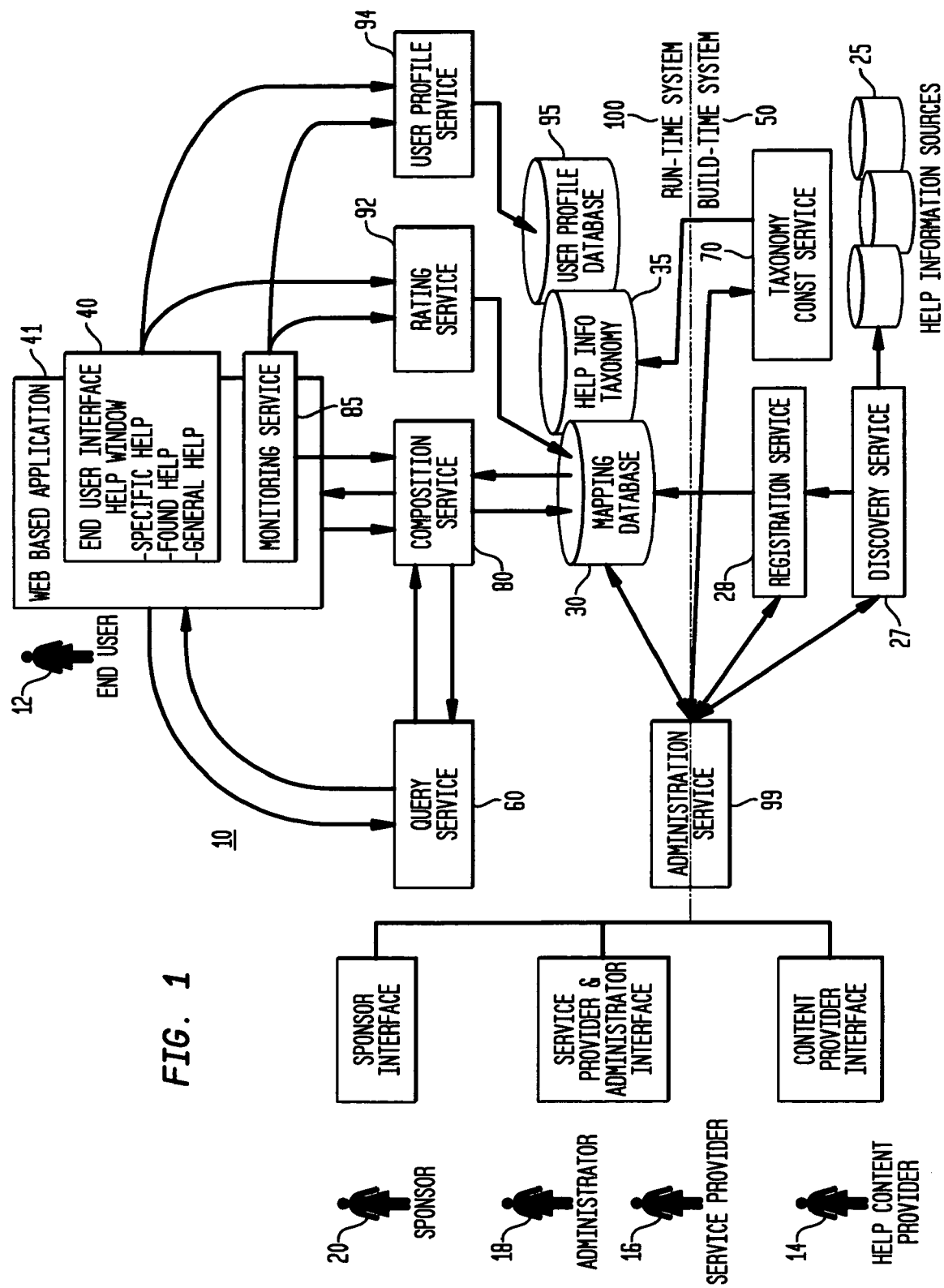
FIG. 1 is a schematic showing an example architecture and conceptual flow of an example system, including major technology infrastructures and user interfaces for stakeholders.

FIG. 1 is a schematic (block diagram) depicting an example architecture and conceptual flow of the on-demand, context-sensitive, integrated help system 10 of the invention which applies service oriented architecture and technologies to provide help content to end users based on negotiated service level agreements between sponsors and service providers. This system 10 integrates structured, semi-structured, and unstructured help information, categorizes the help information into general, specific and found categories, and provides the help content to the end user via a discovered or sponsor provided help taxonomy. This system can, depending on sponsor specified parameters, include the addition of found help from unstructured content which was written after the release of the software which represents the domain of the help content.

As shown in FIG. 1, there are five different types of users of the inventive system 10: (1) end users 12 of the help system, (2) help content providers 14, (3) sponsors 20 of the help system, (4) administrators 18 of the system, and (5) service providers 16. The system 10 provides a user interface for each type of user. The end users 12 specify explicit help queries, view query results, and indicate how they rate the answers provided. Help content providers 14 register their help content for use by the system 10. Sponsors 20 of the system specify the scope of the help content to be provided and other parameters of the required service. Service providers 16 and administrators 18 (who share an interface) specify and modify help content service parameters and monitor performance of help content providers as well as overall performance against the service level agreement with the sponsor.

The inventive system 10 includes a set of subsystem components, such as databases, services and user interfaces, which interoperate to provide relevant help content to the end user consistent with the service level agreements between the sponsor and service provider based on an agreed upon help content domain and performance criteria including metrics such as the user rate of selection and rating of provided help content. Specific subsystem components are associated with either a build-time system 50 or a run-time system 100 with the exception of the Administrative Service 99 that interacts with both the build-time system 50 and run-time system 100.

The build-time system 50 is directed to mining available help information resources 25, extracting the properties of the discovered help information via a discovery service and, assigning metadata according to publicly available or specially constructed help information taxonomies optionally provided by the system. In cases where needed help information is not available, it is developed by contracted help content providers 14 under the direction of the service provider 16. The build-time system 50 includes a registration service that automatically registers the metadata associated with the discovered or contractor developed help content in a mapping database or like memory storage device 30 for use by the run-time system 100. The registration service particularly provides one or more programming interfaces for automatic registration of the discovered help information into the memory storage device 30, and also provides one or more user interfaces which guide an administrator of the memory storage device for manual registration. The build-time system 50 also includes a taxonomy construction service that provides public or specially constructed help information taxonomies 35 to the run-time system 100 for use in selecting the help content provided to the end user. The build-time system 50 also discovers or directs the development of additional help content when the existing metrics associated with the performance criteria in the service level agreement are not being achieved or the metrics themselves are modified by mutual agreement between the sponsor and the service provider. The build-time system 50 optionally enables the service provider to modify various parameters including the currency of the discovered help content, the selection of help content providers, and the use of various user personalization services to better inform the run-time help content selection processes so as to enable the service provider to meet their contractual obligations for the performance metrics associated with the rate of selection and rating scores of help content provided to end users. The build-time system 50 optionally enables the sponsor and service provider to enable implicit user queries based on monitoring of user task performance.

The run-time system 100 is directed to providing relevant help content resources in response to specific user help queries. When a user explicitly specifies a help query, the run-time system 100 normalizes available user context information from various sources agreed upon by the Sponsor 20 and Service Provider 16, including the explicit help query and possibly including previous user ratings, user profile information, and monitoring information based on system configuration and user activity information. The run time system 100 matches this normalized user context information with the help information taxonomy 35 provided or developed by the build-time system 50 to compose an on-demand context sensitive search query. This query is then executed (run) against the mapping database 30 that contains the metadata records associated with the discovered or explicitly authored help content provided by the build-time system 50. The run-time system 100 then uses the associated metadata to access the help information identified by the metadata and renders it in the end user interface 40, categorizing it as specific, found, and general help unless a different categorization has been agreed upon by the sponsor and service provider. The run-time system 100 additionally provides end users with an opportunity to rate the provided help content. If the sponsor and service provider have agreed to enable implicit user queries, the run-time system will provide help content information in the end user interface based on changing user context as indicated by a monitoring service 85 that monitors system configuration and user activity, without requiring an explicit user query.

The Administrative Service 99, which spans the build-time 50 and run-time systems 100, optionally enables the sponsor or service provider to initiate run-time support for implicit end user queries based on a monitoring of user behavior in interacting with the application. The Administrative Service furthermore optionally enables the sponsor to include past user ratings of provided help content through a Ratings service 92 as well as User Profiling services 94 as input to further inform a customized selection of help content to be provided to the end user in response to a new query.

Figure 2:
FIG. 2 is a diagram illustrating an example end user help window user interface, such as in a web browser, where help content selected by the composition service is rendered for selection and rating by the end user.

FIG. 2 is a diagram illustrating an example end user help window user interface 40, such as may be generated for display in a user interface, including a web browser 41, as shown in FIG. 1, where help content selected by a Composition service 80, to be explained in greater detail herein, is rendered for selection and rating by the end user. This interface 40 enables end users to specify help queries via entered search key words 42, to review query results categorized by the system into specific help 44, found help 46 and general help 48 and enables the end user to rate the relevance of provided help content in corresponding entry fields 45, 47 and 49. The help window user interface 40 receives integrated help content including one or more contextual help links specified in one or more markup languages (e.g., in eXtensible Markup Language (XML) format) from the Composition service 80 and implements a styling language (e.g., an eXtensible Stylesheet Language (XSL) format) to render the content on the help window user interface 40. While the help user interface enables input from the user including but not limited to one or more search key words for input to the query service, it additionally enables input of rating feedback for input to the ratings service 92 for one or more help information presented, and input of user profile information to the user profile service 94 for personalization of future help information.

Figure 19:
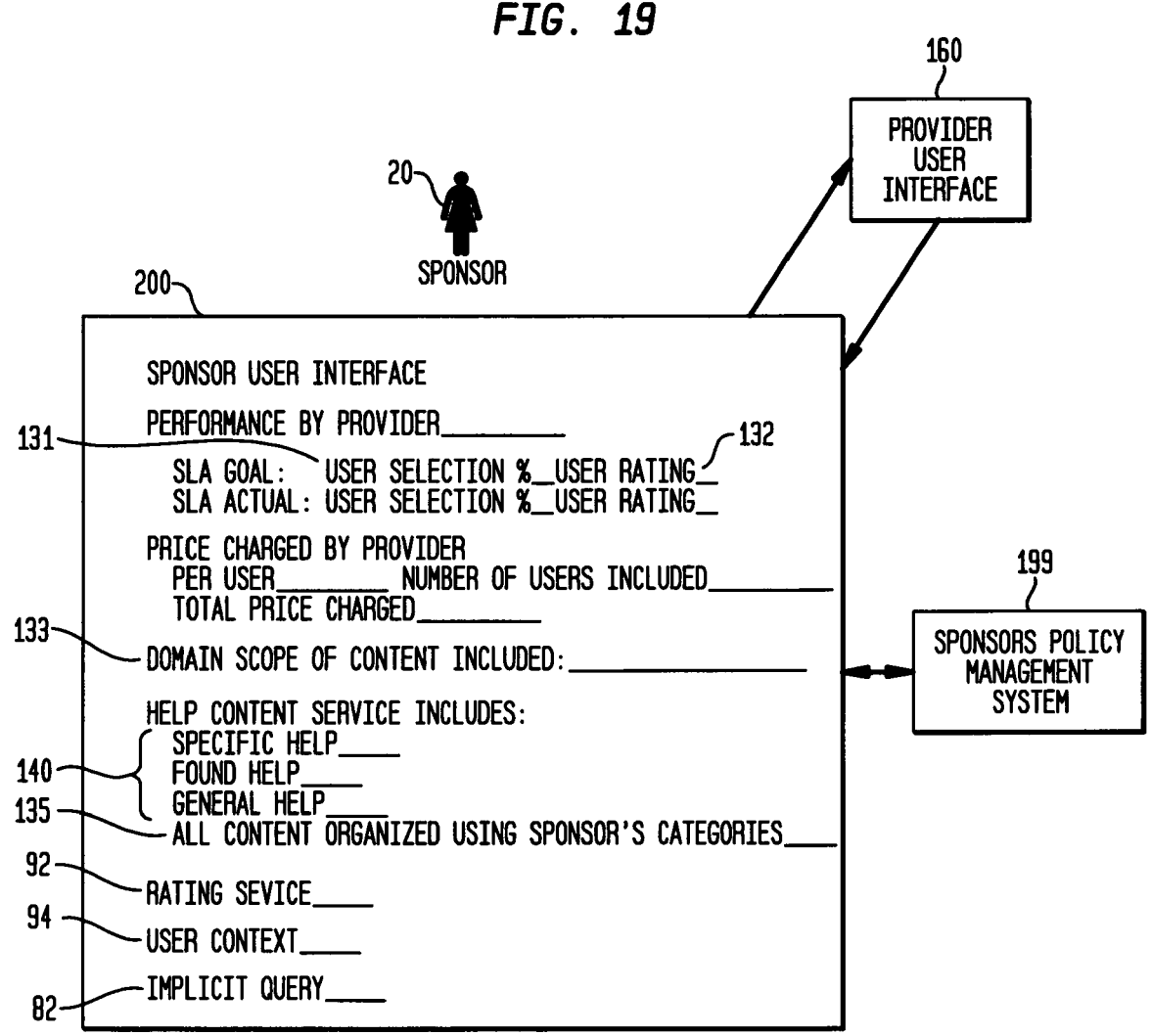
FIG. 19 is a diagram illustrating an example user interface where sponsors specify and modify help content service parameters and monitor performance of the provided help content services against service level agreements with the provider; and, FIG. 20 is a diagram illustrating an example user interface where providers specify and modify help content service parameters and monitor performance of help content provider subcontractors as well as overall performance against the service level agreement with the sponsor.

The operation of the inventive system is initiated when the sponsor 20 and service provider 16 agree on the help content domain and performance metrics associated with the delivery of help content to the end users 12 and enter or modify the specifics of the service level agreement (SLA) on a Sponsor's User Interface 200 shown in FIG. 19. As shown in FIG. 19, the sponsor user interface 200 enables the sponsor to enter or modify the performance metrics including, for example, the domain scope of the help content 133, the minimum acceptable average rate 131 at which end users select the help content provided by the service provider on the End User Help Window User Interface 40 shown in FIG. 2, and/or the minimum acceptable average rating 132 of the selected content by end users. The sponsor 20, via the Sponsor's User Interface 200, can additionally elect to include found help according to categories 140 in the help content service interface provided to end users and to have all the provided help organized via their own categorization system 135, instead of using the categories specific, found, and general (as shown in FIG. 2). The sponsor can additionally indicate that past user ratings services 92, monitoring and user profiling services 94 be implemented to identify the context of specific users which may be used to inform the selection of the provided help content. The sponsor can also indicate via the Sponsor's User Interface 200 if the composition service may compose implicit help queries 82 so that help content can be provided to users who have not explicitly submitted a help query, e.g., in situations where monitoring by the inventive system indicates that the user needs help on a particular task. The Sponsor User Interface 200 shown in FIG. 19 further interfaces with the sponsor's policy management system 199 to check that the agreed upon metrics and provided services are consistent with the sponsor's corporate policies. The Sponsor's User Interface 200 interfaces with the Provider's User Interface 160 shown in FIG. 20 whereby the Service Provider specifies detailed parameters of the operation of the inventive system so as to enable meeting the performance metrics for the service level agreement with the sponsor.

Figure 20:
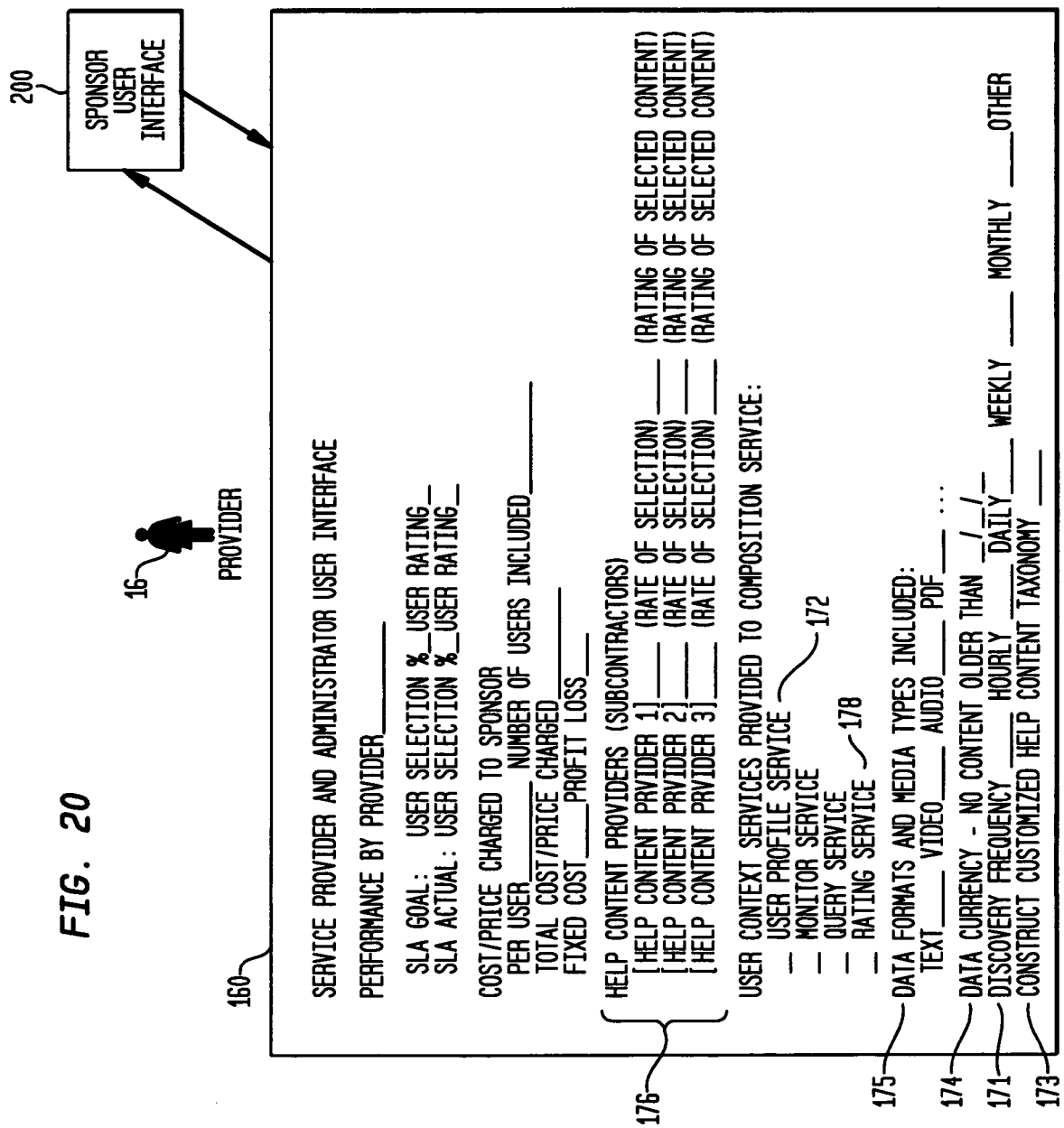

As shown in FIG. 20, the service provider user interface 160 enables the service provider to specify and modify help content service parameters and monitor performance of help content provider subcontractors as well as the overall performance against the service level agreement with the sponsor. For example, as shown in FIG. 20, the Service Provider 16 may decide to incur the additional expense of configuring the system to increase the likelihood of meeting the agreed upon service level agreement performance metrics immediately rather than waiting until inadequate metrics require system adjustments at the risk of a weakening the business relation with the Sponsor 20. Examples of configuration changes that the Service Provider 16 might decide to make via the service provider interface 160 of FIG. 20 before the first end users submit help queries include, but are not limited to: discovering (data mining) and registering at a specified frequency 171: help content according to a specified data format including, but not limited to: ASCII text, RTF, Word format, and PDF, and media type 175 including, but not limited to: text, still image, video, and audio, and according to a specified data currency indication 174; and/or mining more engaging multimedia versions of the same help content, increasing the frequency of mining for newly available help content, or employing service for constructing customized help content taxonomies 173 rather than relying on publicly available help content taxonomies.

Figure 8:
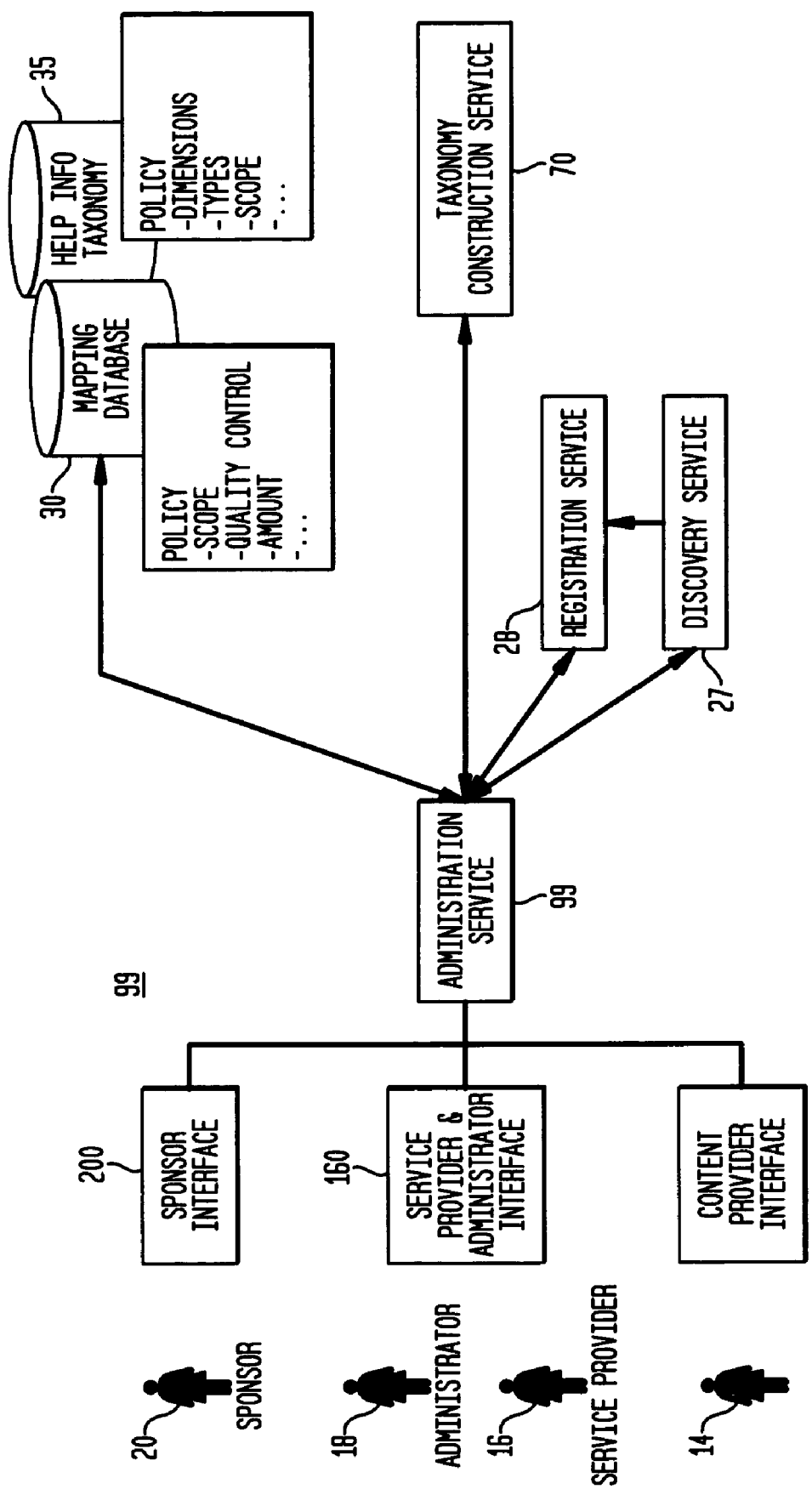
FIG. 8 is a schematic showing an example architecture of an example administration service which specifies metadata and enforces policies about the help content provided to end users.

After agreement on the metrics for the help content service level agreement between the Sponsor and Service Provider, and before the first help content query by an end user, the system 10 performs several pre-processing steps including:

1) The build-time system 50, via the Administration Service 99 shown in FIG. 8, checks the parameters specified on the Service Provider User Interface 160 shown in FIG. 20 and the Sponsor User Interface 200 shown in FIG. 19 to determine the startup help content domain and specified parameters, help content currency, included media types, and whether a standard help taxonomy or customized help taxonomy is required.

Figure 9:
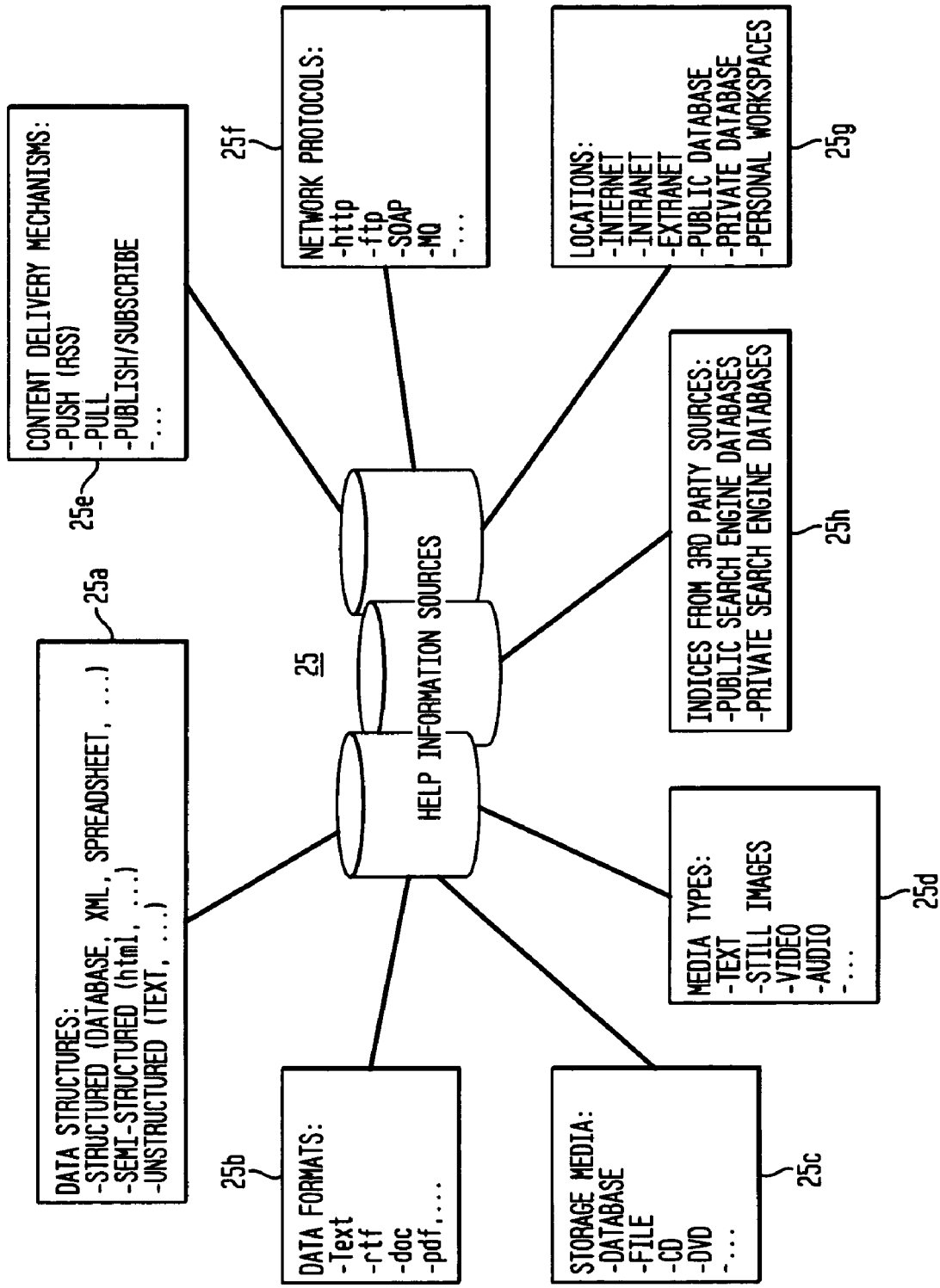
FIG. 9 is a diagram illustrating the types of help information sources from which content is selected for presentation to end users in response to explicit or implicit queries.
Figure 10:
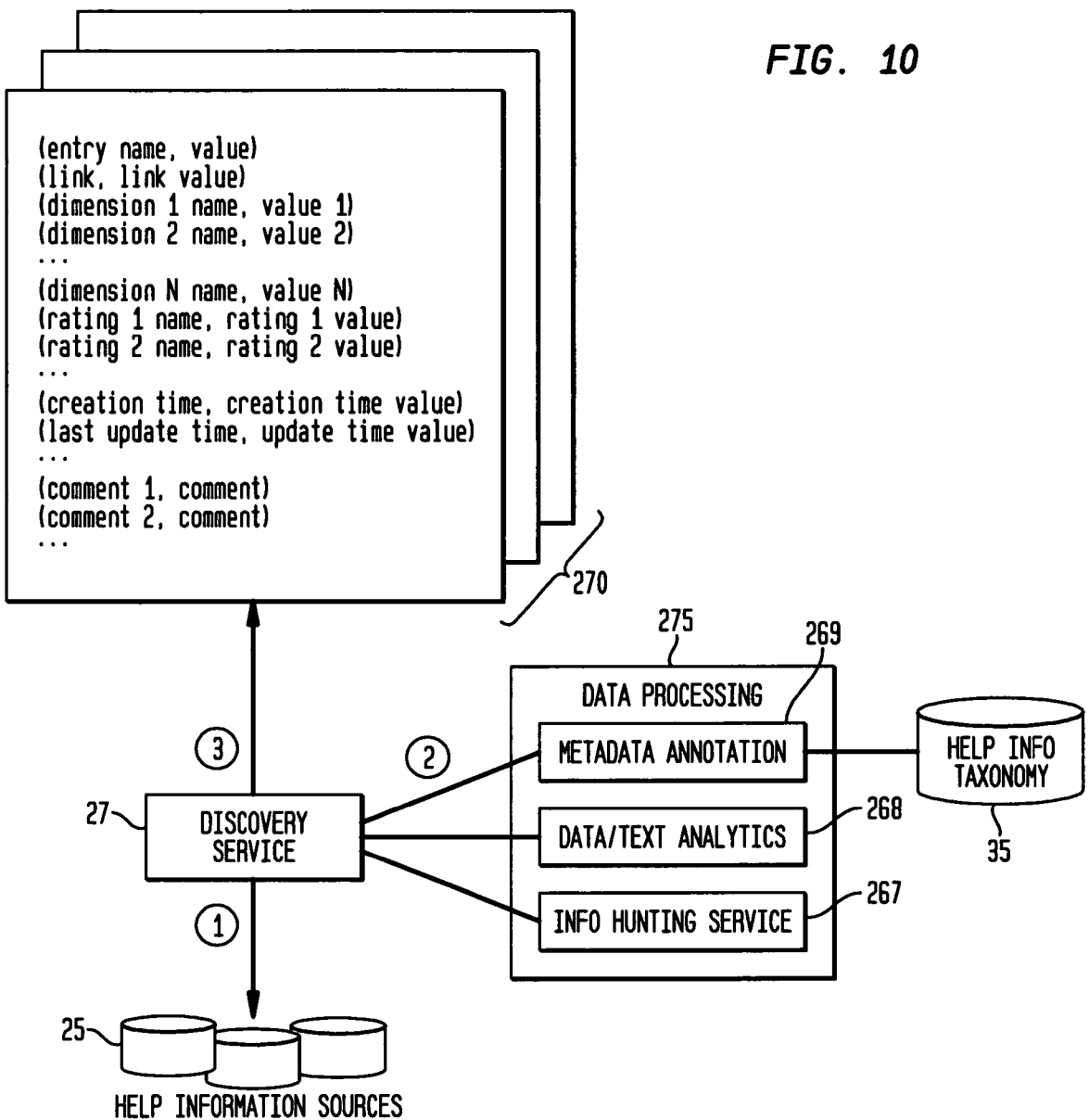
FIG. 10 is an example record and a schematic showing an example architecture of an example discovery service which crawls help information spaces and extracts and organizes metadata concerning the discovered help information.

2) The Administrative Service then directs the Discovery Service 27 shown in FIG. 10 to perform the following: crawl the subset of Help Information Sources 25 shown in FIG. 9 which are consistent with the startup parameters. As shown in FIG. 9, Help Information Sources 25 include, but are not limited to: various data structures 25a including structured data (e.g., database, XML, spreadsheet), semi-structured data (HTML) and unstructured data (e.g., text); various data formats 25b (e.g. text, rtf, doc, pdf); various storage media 25c (e.g. database, file, CD, DVD); various media types 25d (e.g. text, still images, video, audio); various content delivery mechanisms 25e (e.g. push—RSS, pull, publish/subscribe);

various network protocols 25f (e.g. http, ftp, soap, mq); various locations 25g (e.g. internet, intranet, extranet, public database, private database, personal workspaces); and additionally help information and indices from third party sources 25h including public search engine databases.

Figure 6:
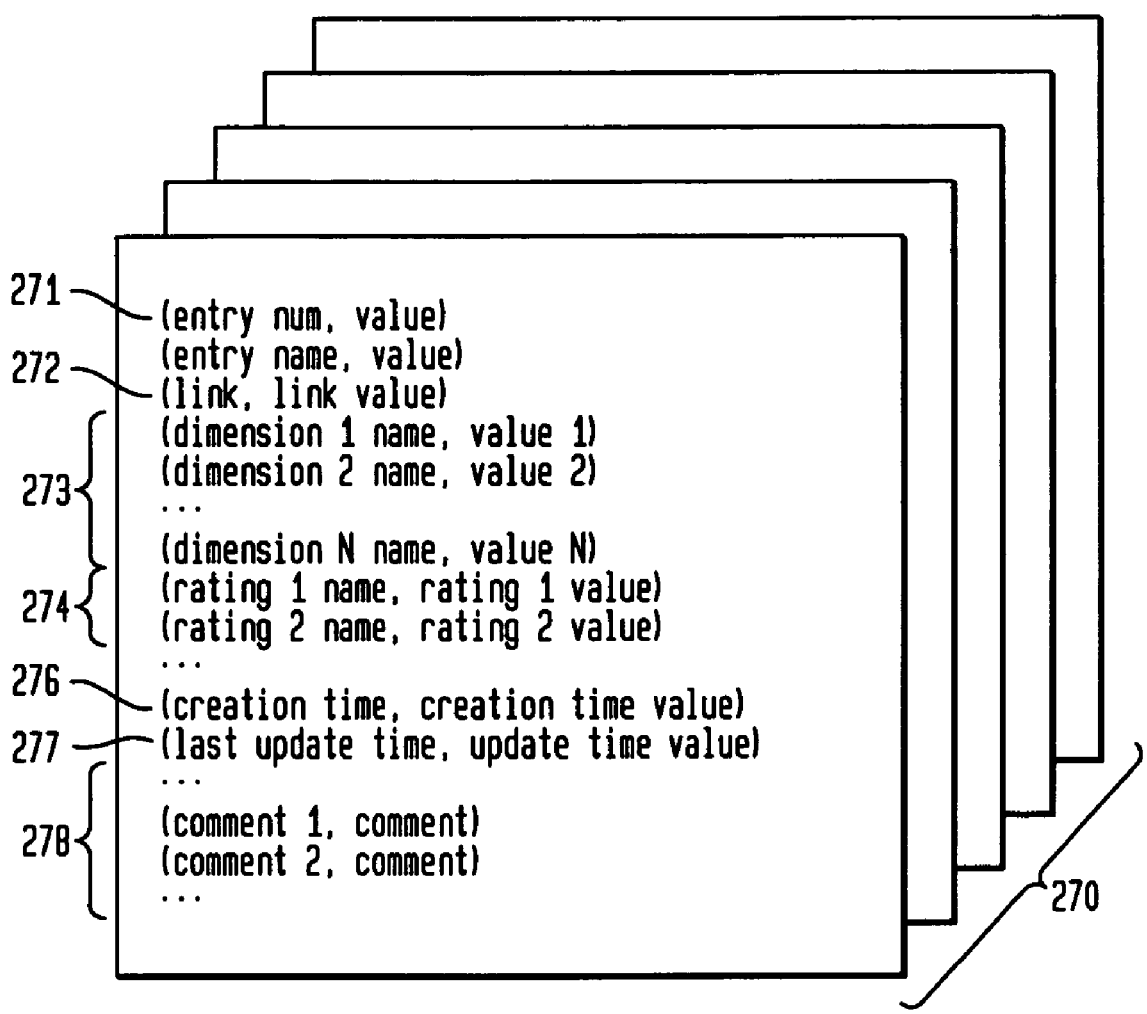
FIG. 6 is an example record in the example mapping database which includes metadata and serves as an index to the actual help content available from various sources and is provided to end users in response to explicit or implicit searches.

3) As further shown in FIG. 10, the Discovery Service 27 is additionally directed to perform the following: extract the properties of the discovered help information 25 and organize/categorize it relative to the provided help information taxonomy 35 by using various data processing techniques 275 including, but not limited to: information hunting process 267 that gathers information from the Web or computer networks by using software known as "crawler" which discovers and collects (hyper)links of documents (pages) in the net for the purpose of garnering useful information from the collected pages (this is a standard way to collect information from the network, which is used by most search engines on the Web including Google, Yahoo, Inktomi, MSN, ... ), data and text preprocessing and cleansing, text/data analytics 268, and, to identify a number of metadata 270 about the discovered help information by performing metadata extraction, and metadata annotation 269. As shown in FIG. 6, metadata information stored in the mapping database in the form of a record (s) 270 include information and annotations such as: an entry name and value 271; a link to the help content and corresponding link value 272; one or more dimension names and corresponding values 273; one or more rating names and corresponding rating values 274; a creation time and creation time value 276; a last update time and update timestamp value 277; and any associated comments 278.

Figure 3:
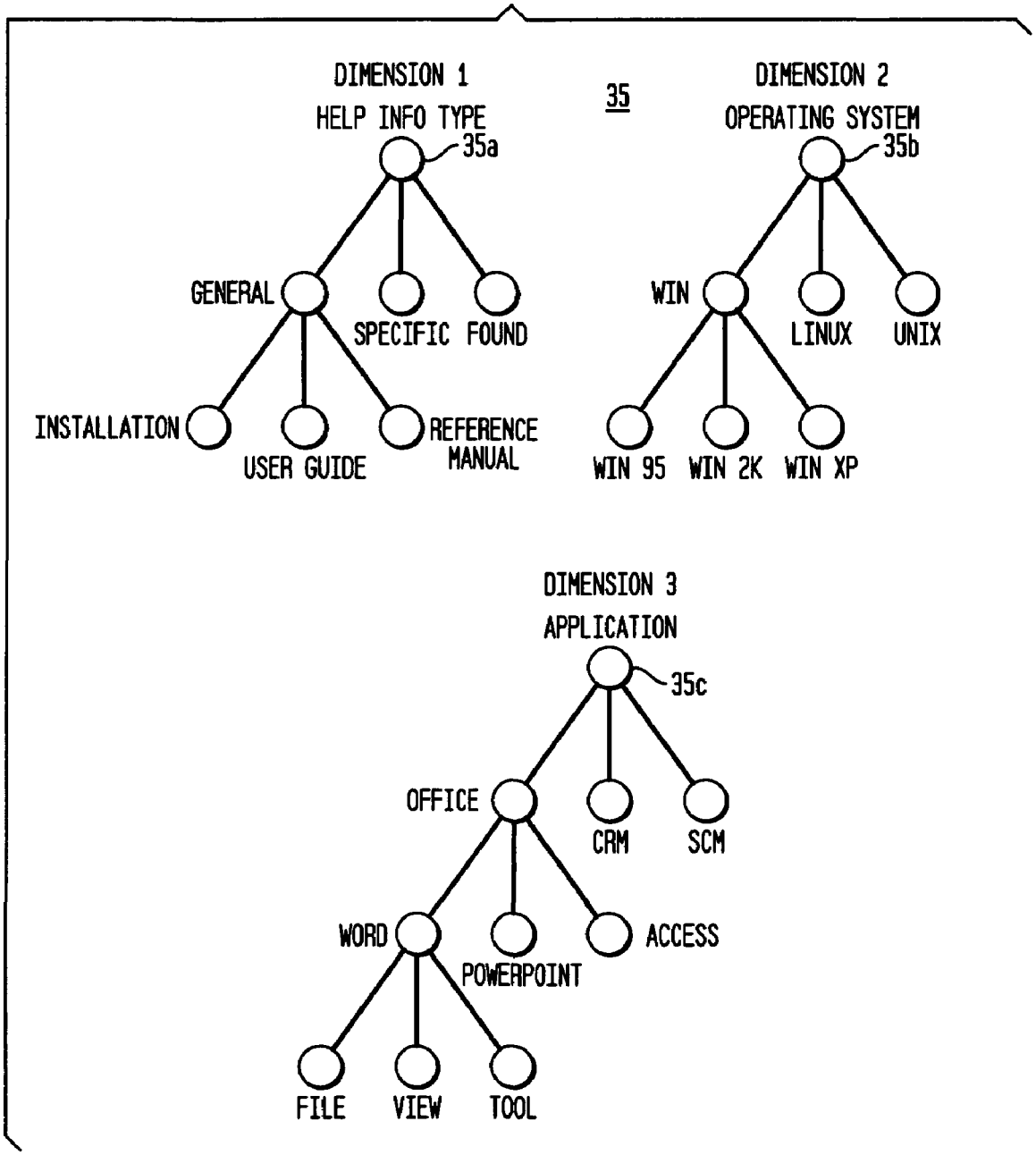
FIG. 3 is a schematic which shows an example help information taxonomy.

An example of Help Information Taxonomy content 35 is shown in FIG. 3. The Help Information Taxonomy 35 provides a controlled vocabulary, i.e., a set of canonical terms for the domain to provide a shared, common understanding to information of interest, for help information, specifies hierarchical relationships among the terms defined, and also provides a multi-dimensional and hierarchical view of the help information. Various Help Information Taxonomy dimensions include, but are not limited to: help information types 35a (e.g. general, specific, found) with an example of a general help information type including an Installation User Guide or a Reference Manual; an operating system dimension 35b (e.g. Windows, Linux, Unix) with an example of a Windows operating system type including Windows 95, Windows XP, etc.; an application type dimension 35c (e.g., personal productivity software, customer relationship management, supply chain management) with an example of a personal productivity software type including Microsoft Office tools including Word, PowerPoint and Access; and, a time dimension and rating dimension (not shown), if any rating data is available prior to system startup. It should be understood that a information taxonomy comprises any combination of automatically generated taxonomy, semi-automatically generated taxonomy, and manually generated taxonomy, and comprises number, types, depth, width, and scope attributes adapted to be managed by a system administrator via the administration service 99. In general, taxonomy consists of concepts (or terms) of the domain of discourse and their properties, and its "attributes" mean the properties of concepts in taxonomy. The properties can be simple attributes as given examples here, i.e., version number and type of an operating system, or the relationships among concepts in the taxonomy. It is understood that automatically generated taxonomy may include, but is not limited to: structural information of help information derived by implementing one or more software transformation tools from structured information including but not limited to: database schema, XML, HTML, and computer programs written in one or more computer programming languages such as Java and C. Further, the semi-automatically generated taxonomy includes, but is not limited: to structural information of help information derived by using one or more software tools for text analysis and manually from the semi-structured or unstructured help information content. The manually generated taxonomy includes but is not limited to: structural information of help information created manually using one or more taxonomy editing software tools.

4) As shown in FIG. 8, the Administrative Service 99 additionally directs the Registration Service 28 (shown in FIG. 11) to automatically register the metadata associated with the help information sources discovered by the Discovery Service 27 as records 270 (FIG. 6) in the mapping database 30, after adding useful management metadata annotations 269 such as timestamps. The mapping database 30 includes metadata on help information sources meeting the initial parameters specified by the Sponsor 20 and Service Provider 16. Entries in the mapping database 30 may be specified in XML (extensible Markup Language) among other information specification languages. Only the metadata about the Help Information Sources 25 shown in FIG. 9, including one or more links to the help content, is stored in the mapping database 30. Actual help content, as opposed to the index (indices), is not stored in the mapping database.

Figure 7:
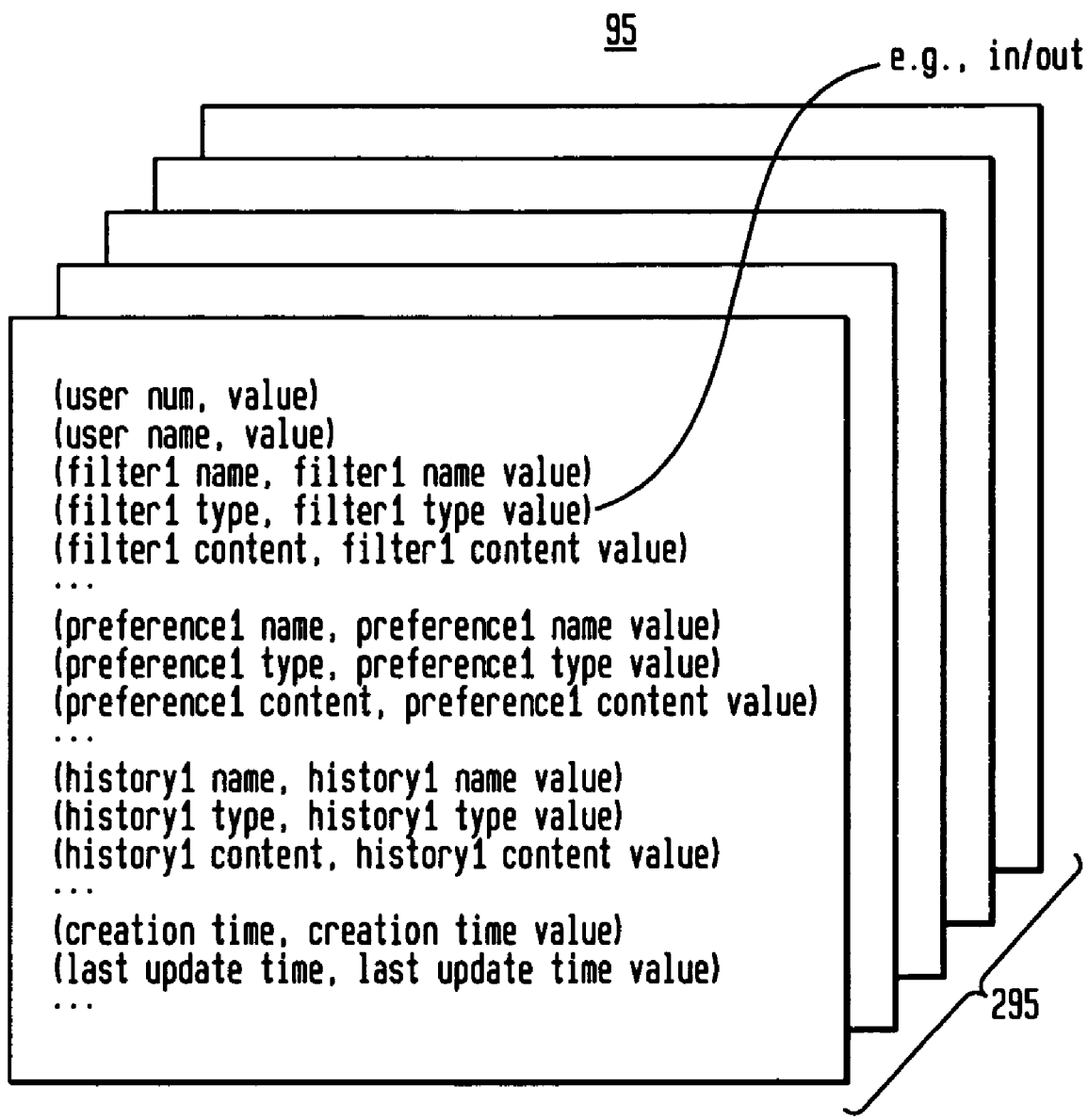
FIG. 7 is an example record in the example user profile database which stores profile information of individual users or user groups.
Figure 16:
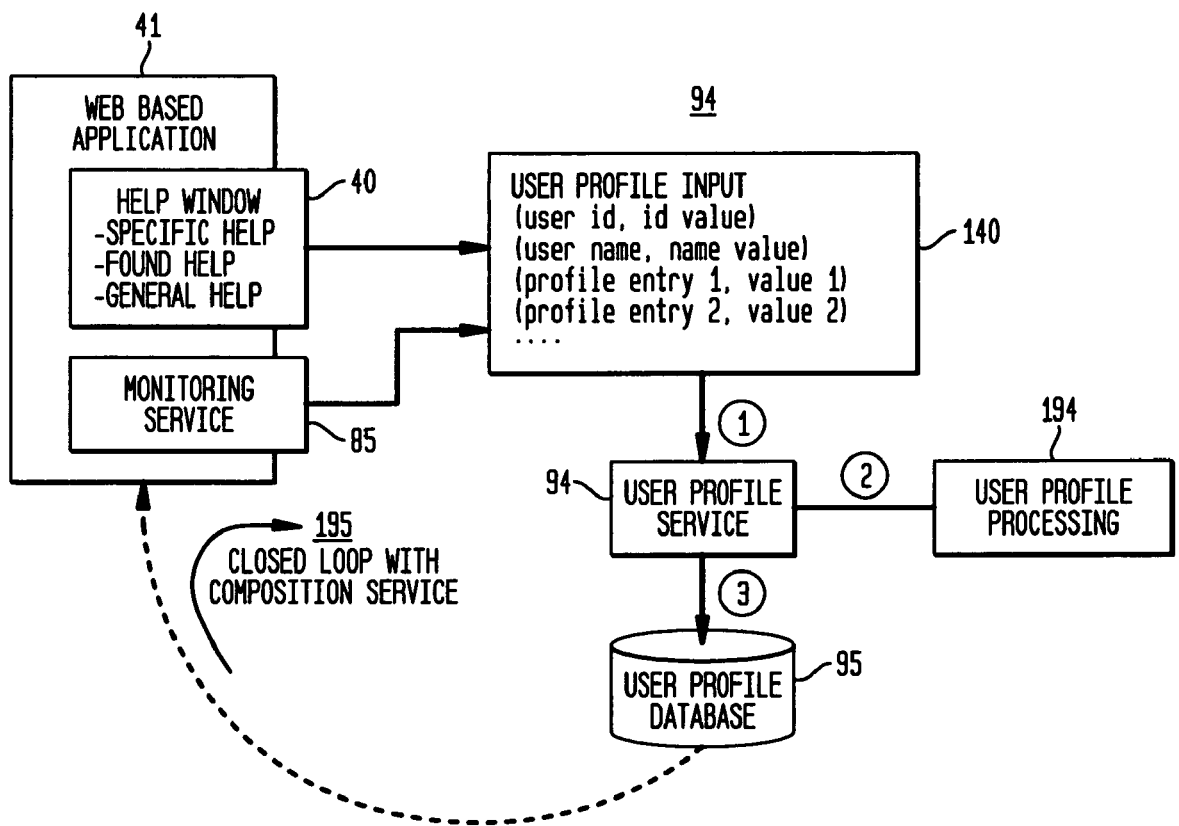
FIG. 16 is a schematic showing an example architecture of an example user profile service which collects user profile input from user help content choices as well as other sources, processes the input and updates the user profile database for use by the composition service in responding to future queries.

5) If the sponsor 20 and service provider 16 have agreed to include user profiling services 94 as part of the input to user context services to further inform a customized selection of help content to be provided to the end user in response to a new query, the "user profile service" option 172 is selected on the Service Provider and Administrator's User Interface 160 as shown in the example interface depicted in FIG. 20, for recognition by the system 10. Prior to the first user query, the system's User Profile Service 94 will create a startup User Profile Database 95 having records 295 as illustrated in FIG. 7. The User Profile Database 95 particularly stores profile information concerning individual users of the help system 10 as well as groups of users. As shown in FIG. 7, each user profile record 295 includes content including, but not limited to: user identification data, filter data, preference data, history data, and record metadata. The user identification data provides information on the user's identification by using a unique number, names, addresses, passwords, ... etc. The filter data provides information on the filters the user set when the profile was created and revised. For example, the user could set whether he/she does (or does not) want to receive information on operating system updates whenever a new patch becomes available. The preference information provides the information on the user's preference on the help information. For example, the user could prefer receiving information on Java and J2EE whenever possible to receiving information on VisualBasic and .Net. Finally, the record metadata stores auxiliary information such as when the record was created or revised. The User Profile Service 94, illustrated in FIG. 16, is adapted to 1) collect user profile input 140 from user content help choices on the End User Help Window User Interface 40 (illustrated in FIG. 2) in addition to input from other sources such as third party user profile information sources. The User Profile Service 94 is also adapted to collect system configuration and user activity information provided by the Monitor Service 85 as will be described with respect to FIG. 17. Prior to the first user query, the User Profile Service 2) processes available third party user profile information and system configuration information and 3) stores it in the User Profile Database 95 for use by the inventive system in composing responses to user help queries, as will be discussed in further detail hereinbelow.

6) If the sponsor and service provider have agreed to include user ratings of help content as part of the input to user context services to further inform a customized selection of help content to be provided to the end user in response to a new query, the "rating service" choice 178 selected via the Service Provider and Administrator's User Interface 160 in FIG. 20 will be recognized by the system. Prior to the first user query, the inventive system's Rating Service 92 will add metadata annotations 269 in the form of additional fields to the records 270 maintained in the mapping database 35, to include the end user ratings 274 of help content to be provided to users in response to help queries using the system. Any ratings metadata 274 collected by the Discovery Service 27 will also be stored in related ratings fields by the Registration Service 28.

The operation of the system 10 is initiated by the first explicit or optionally the first implicit end user help query. That is, the composition service 80 provides for both implicit and explicit search queries with implicit search queries being constructed automatically from the context information without any search key word input from the user; and explicit search queries are constructed automatically by combining the context information with one or more search key words input from the user submitted via the query service. End users 12 interact with the system 10 via the End User Help Window User Interface 40 illustrated and described herein with respect to FIG. 2. In the case of an explicit help query, the end user types the search key words 42 and selects the GO button 43. Alternatively, the end user can type a natural language query or a problem description. It is understood by those skilled in the art that speech recognition devices or other natural interfaces can optionally be employed to enable end users to enter their help queries. As shown in the system architectural overview of FIG. 1, the explicit user query is provided to a Query Service 60 the details of which are now described herein with respect to FIG. 14. The Query Service 60, part of the Composition Service 80 of the system, is adapted for processing explicit user queries via publicly available text summarization software in order to identify search terms to be used as input by the Composition Service 80 in constructing an on-demand context sensitive user query. In the case of explicit user help queries, the Composition Service 80 receives input 65 from various sources, depending on the user context services agreed upon by the sponsor and service provider, in addition to the search terms, e.g., query context 62, identified by the Query Service 60 from the explicit user query.

Figure 17:
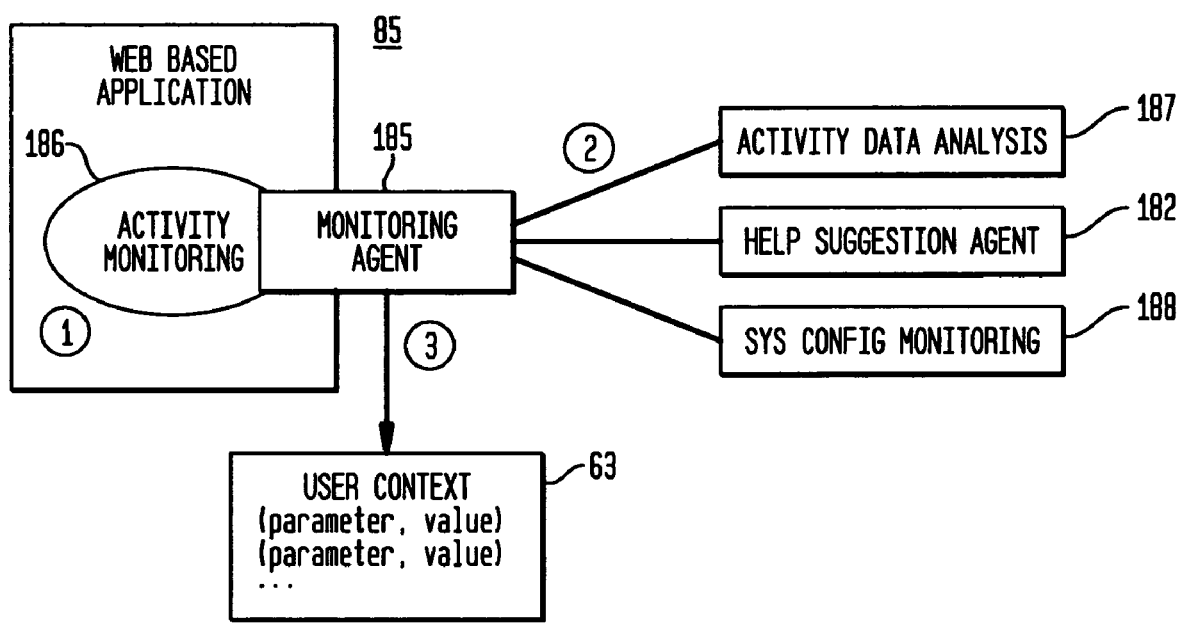
FIG. 17 is an example schematic showing an example architecture of an example monitor service which collects system configuration and user activity information, and suggests to the rating service and user profile service respectively how the mapping and user profile databases should be updated for use by the composition service in responding to future queries.

These additional inputs 65 to the Composition Service 80 may include user context information 63 obtained from the Monitor Service 85 (shown and described in greater detail herein with respect to FIG. 17) which runs in the background and monitors and collects data relating to the user's activities with the application(s) included in the domain of the help content agreed upon as part of the service level agreement. Particularly, as shown in FIG. 17, the Monitor Service 85 uses publicly disclosed techniques to analyze user activity data 187 and guess and/or suggest the type of help needed by the user (e.g. general, introduction, how to, reference). The Monitor Service 85 also detects and collects information on the system configuration 188 used by the end user (e.g., operating system, bandwidth, processor, web browser version, etc.) and sends this system configuration information and the guess regarding the type of help needed to the Composition Service 80 for use in response to the current user query. As illustrated in FIG. 16, the Monitor Service 85 also provides input to the User Profile Service 94 and updates the user profile information records 295 maintained in the User Profile Database 95 (illustrated in FIG. 7). As illustrated in FIG. 15, the Monitor Service 85 additionally collects user ratings 145 of provided help content which is fed back for processing by the Rating Service 92 which processes and aggregates the rating values and inputs them to the mapping database to inform responses by the Composition Service to user help queries. Returning to FIG. 14, the Ratings Service 92 thus provides ratings context information 67 as input to the Composition Service and the User Profile Service 94 provides user profile context information 66 as input to the Composition Service.

Figure 13:
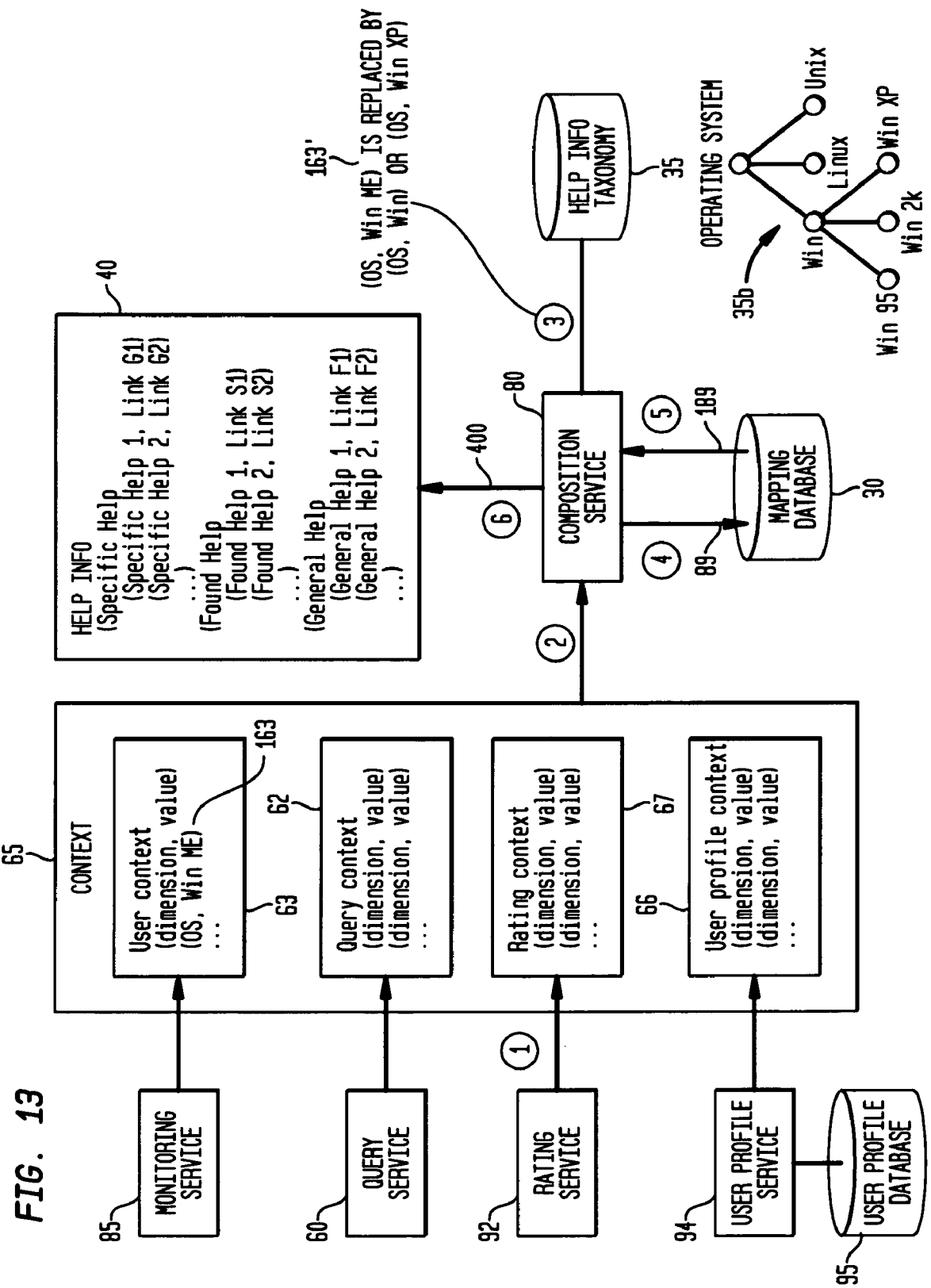
FIG. 13 is a schematic showing an example architecture of an example composition service which uses an example help information taxonomy to provide generalized help content related to the generated context sensitive end user search query.
Figure 14:
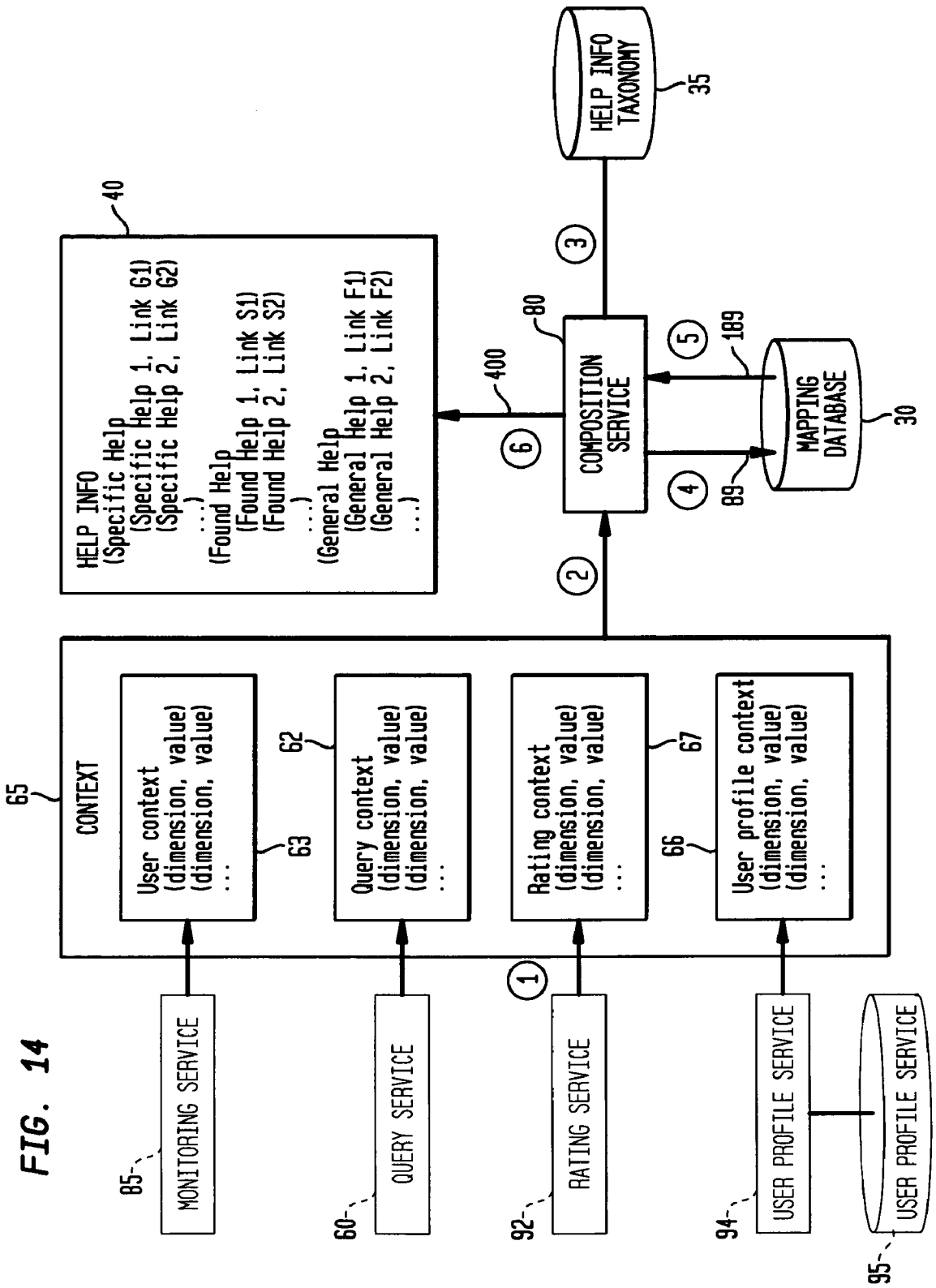
FIG. 14 is a schematic showing an example architecture of an example composition service including an example query service which allows user to specify explicit search key words or phrases for help information, and also allows the use of prior art text summarization software that constructs a user query from a problem description by user.
Figure 15:
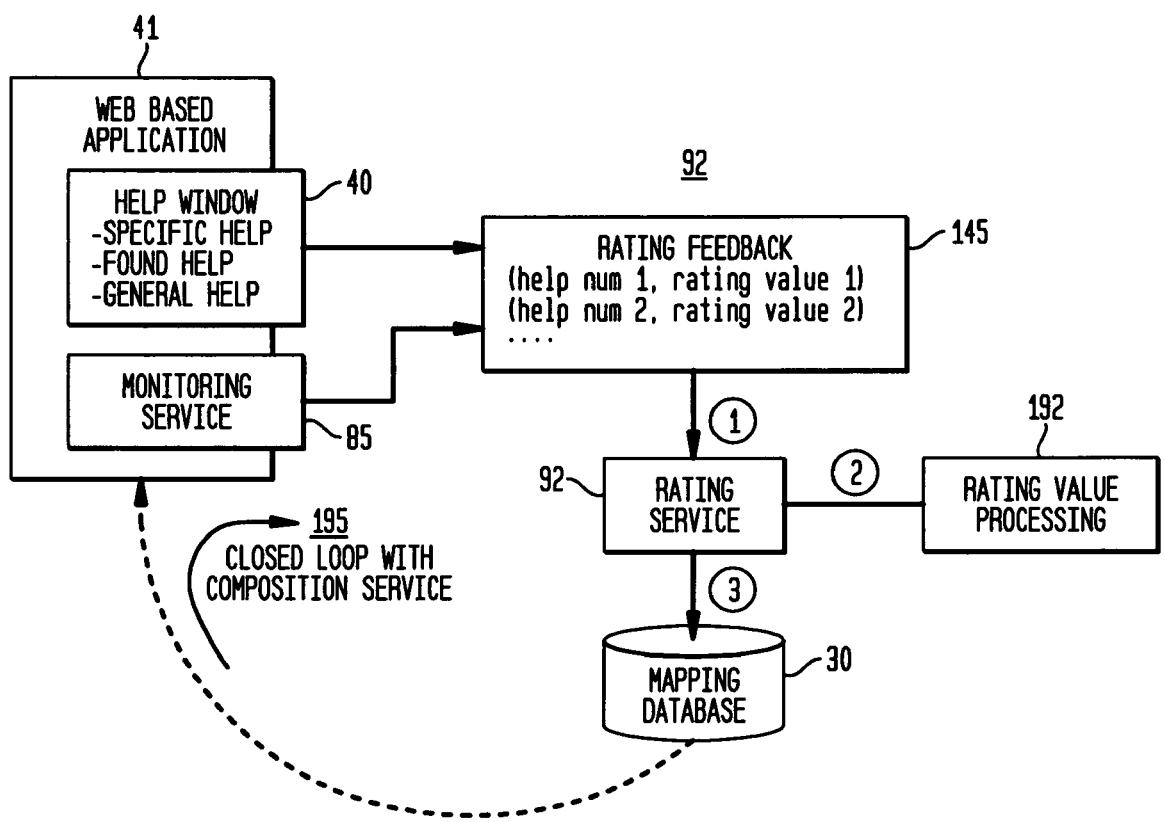
FIG. 15 is a schematic showing an example architecture of an example rating service which collects help content rating feedback from end users, processes and aggregates the rating values, and provides the results to the mapping database for use by the composition service in responding to future queries.

The Composition Service 80 illustrated in FIG. 14, after receiving input 65 from the various sources including the monitoring service 85, query service 60, rating service 92 and user profile service 94, performs content information extraction which involves integrating and normalizing the user context information from different sources which could be in conflict. The Composition Service 80 matches the normalized user context information with the help information taxonomy to create an on-demand, context sensitive search query 89 which is executed (run) against the metadata in the mapping database. It is understood that the composing means is adapted to select from one or more help information taxonomies depending on the received user context information. The mapping database 30 returns the metadata 189 associated with the relevant help information, possibly modifying the search query using the Help Information Taxonomy 35 for generalization/specialization synonyms as illustrated in FIG. 13. In the context of the invention, a taxonomy provides hierarchical relationship among terms, which provides hyponyms and hypernyms of a term. For example, a hierarchy of operating system related terms may be considered as follows: Windows XP professional edition->Windows XP->Windows Operating System->PC Operating System->Operating System->System Software->Software->Computer Code->Coding System->Communication . . . . When a query is given to the system, the system will automatically specialize or generalize the query by using this taxonomy, i.e., the hierarchical relationship of terms. For example, if the query is about Windows XP, if necessary to provide a better and broader answer to the query, the system can generalize it to one about Windows Operating System. Or, it may customize the query into one about Windows XP Professional Edition if it finds appropriate to limit the scope of the query and to provide only relevant answers. Thus, the Composition Service is adapted to generalize or specialize one or more entries in the context information input by using the hierarchical structural information of the help information taxonomy, and/or disambiguate one or more entries in the context information input by using the multi-dimensional structural information of the said help information taxonomy. Then, as shown in FIG. 14, the Composition Service 80 accesses the actual Help Information Sources 25 (as shown and described herein with respect to FIG. 9) identified by the metadata and (6) renders the help information response 400 in the End User Help Window User Interface 40 (shown in FIG. 2) in the categories of specific, found and general help-unless a different categorization is indicated on the Sponsor's User Interface 200 (as shown and described herein with respect to FIG. 19).

The end user 12 who submitted the query then selects, via their interface 40 (shown in FIG. 2), from the presented help content by clicking on the links of interest, and rating the help content selected. As shown in FIGS. 15 and 16, these selections and ratings are captured, along with current system configuration and user activity data, by the inventive system's Monitor, User Profile and Rating Services for use in a closed loop system 195 for informing subsequent Composition Service 80 responses to future help queries.

Figure 12:
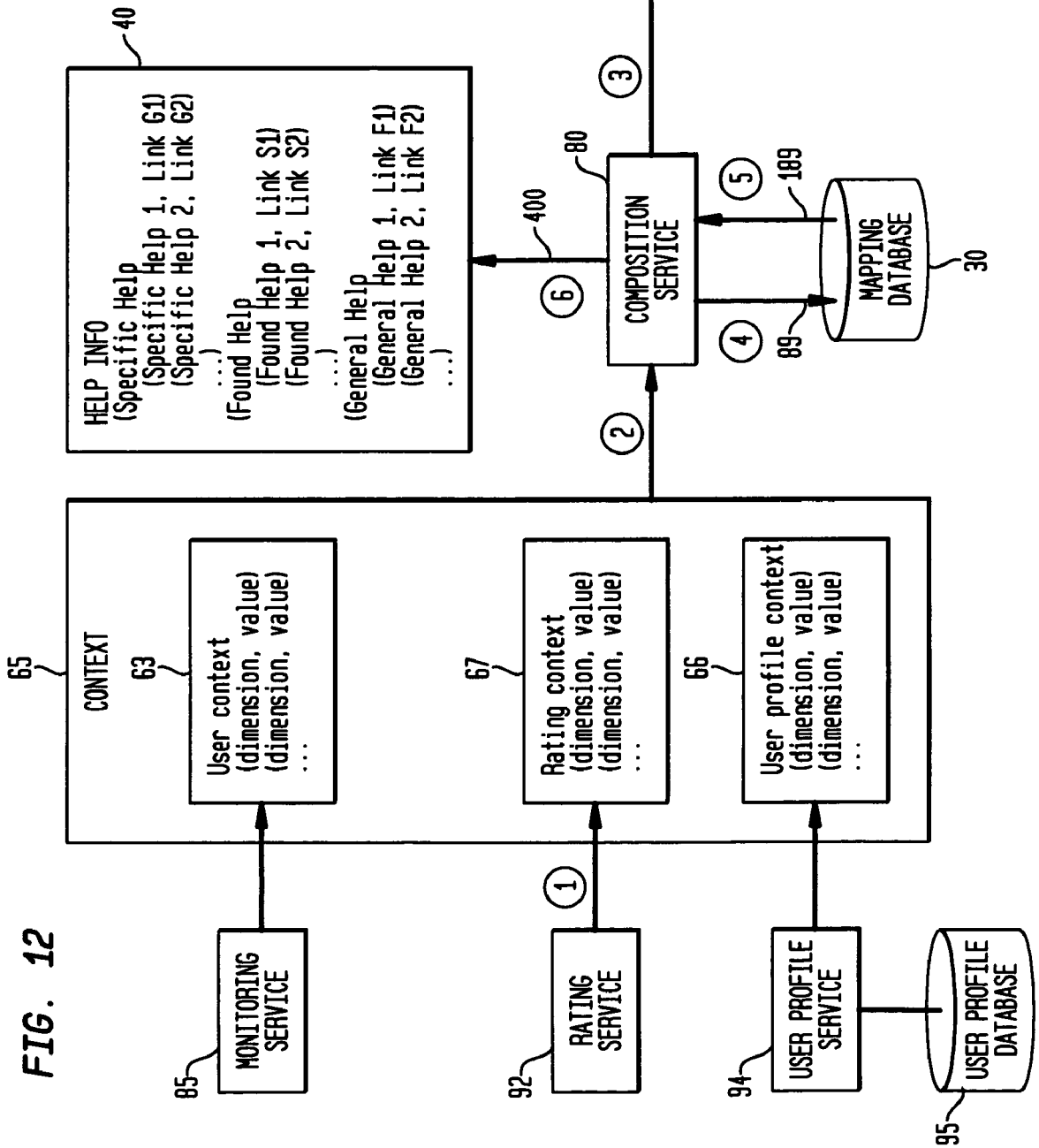
FIG. 12 is a schematic showing an example architecture of an example composition service which creates an implicit context sensitive end user search query and renders to the end user the help content provided by the mapping database based on the query.

Referring now to FIG. 12, in the case of (an) implicit user help queries (query), the input from the explicit query is lacking but the process followed by the Composition Service 80 in identifying and rendering help information to the end user is otherwise the same as described for the explicit user query example described herein with respect to FIG. 14.

As noted earlier, the system's run-time system 100, in response to an explicit or implicit user help query, matches normalized user context information collected from a variety of sources with the help information taxonomy 35 to compose an on-demand context sensitive search query 89. This query is then executed (run) against the mapping database 30 that includes the metadata associated with the discovered or explicitly authored help content provided by the build-time system 50. The build-time system initially uses the same help information taxonomy, via the Discovery Service 27 and Registration Service 28, to organize the help information in the mapping database 30. As noted earlier, the inventive system's build-time system 50 provides publicly available help information taxonomies for use by the run-time system's Composition Service 80 as well as the build-time system's discovery and registration services. Otherwise, at the option of the Service Provider or Administrator via their interface 160 illustrated in FIG. 20, a specially constructed, customized help information taxonomy 173 may be designed to increase the end user rate of help content selection and ratings which serve as performance metrics for the service level agreement.

Figure 4:
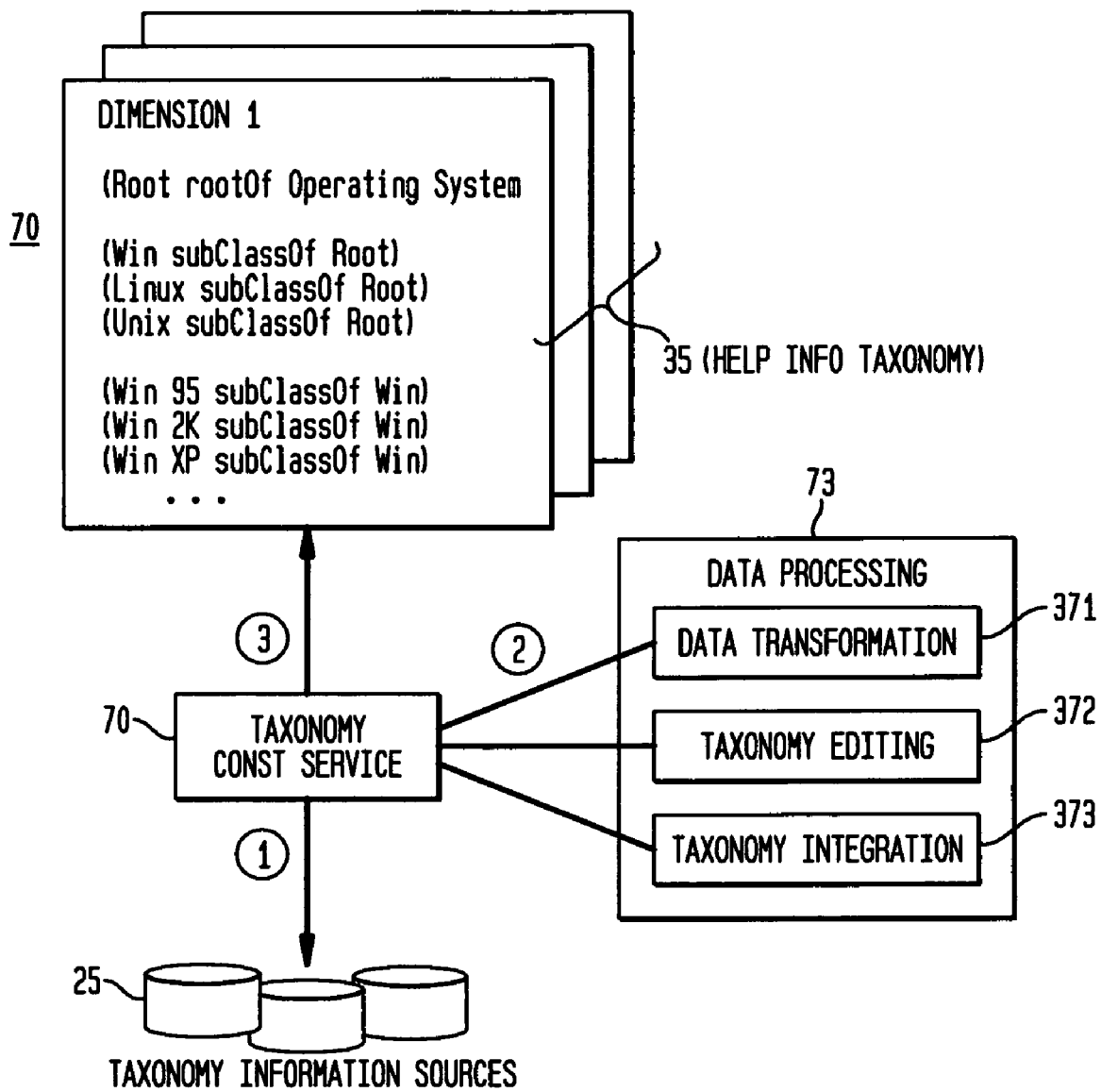
FIG. 4 is a schematic showing an example taxonomy construction service based on integrating classification information extracted from structured, semi-structured, and unstructured sources of help information.
Figure 5:
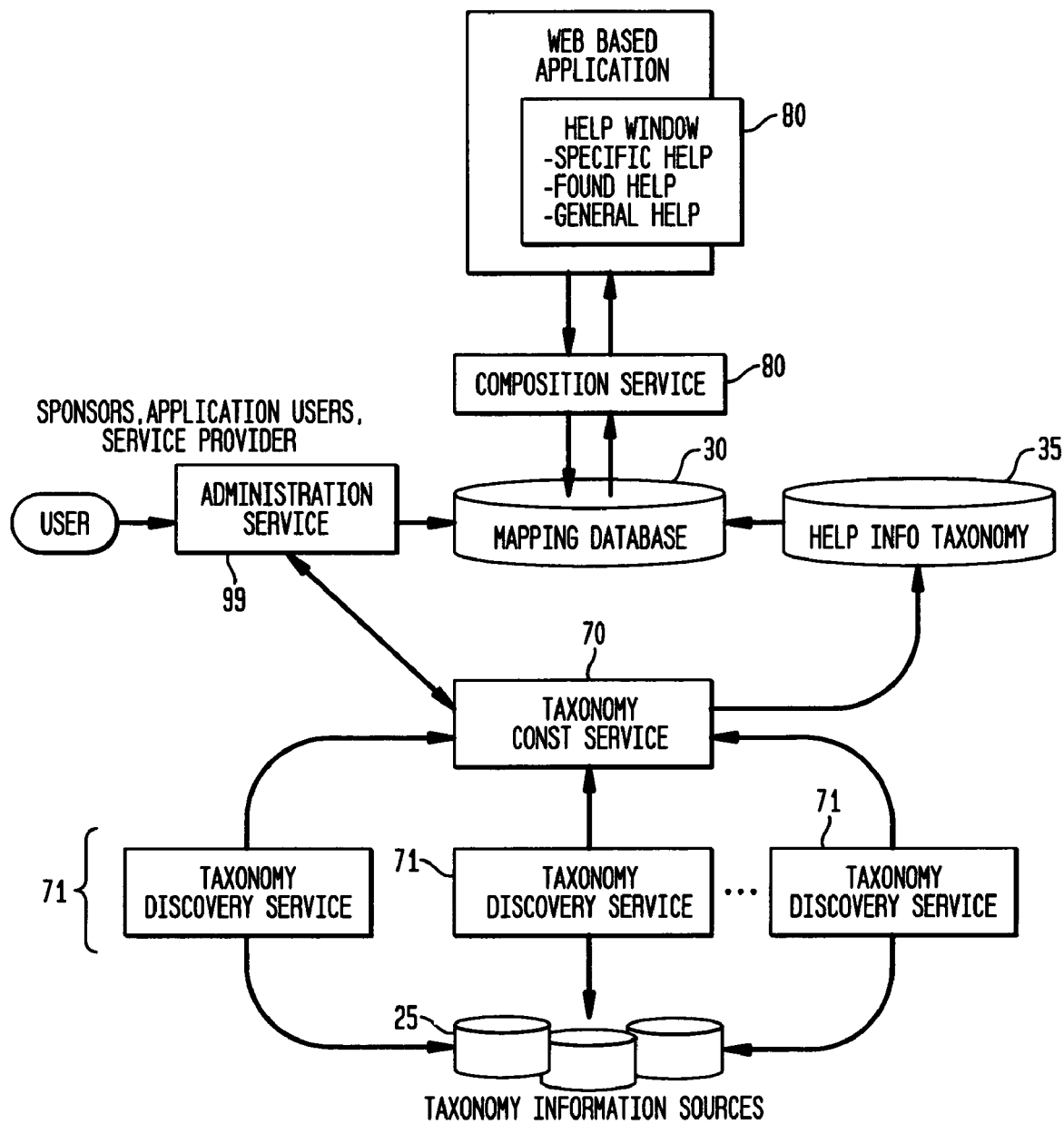
FIG. 5 is a schematic showing an example architecture and end to end conceptual flow of an example help information taxonomy construction service, including major technology infrastructures.

More particularly, FIGS. 4 and 5 respectively illustrate the operation of the system's optional Taxonomy Construction Service 70. If the service provider 16 has elected to provide a customized help information taxonomy, the selection of the option "construct customized help content taxonomy" 173 provided on the Service Provider or Administrator User Interface 160 is noted by the Administration Service 99 (illustrated in FIG. 8) as part of the initial operation of the build-time system or, after system startup if the option is being subsequently selected, e.g., in response to service provider concern over weak performance metrics. The Administration Service 99 then directs the Taxonomy Construction Services 70 discovery service 71 shown in FIG. 5 to access various sources of help information taxonomy information 25 in various locations (e.g. the Internet, intranet, personal workspace). These services may use crawler technology to collect the taxonomy information, or use programmatic interfaces if available. After accessing the help information taxonomy information 25, the taxonomy discovery service 71 filters it and provides it to the Taxonomy Construction Service 70 as its input.

As shown in FIG. 4, the Taxonomy Construction Service 70 performs a number of data taxonomy management operations 73—including processing and transforming data in one form to another, creating an initial taxonomy from the given data, editing the initial taxonomy, and integrating two or more taxonomies from different sources to provide a canonical taxonomy. The inventive system provides taxonomies integrated not only from unstructured information sources but also structured and semi-structured information, by using publicly disclosed transformation tools and taxonomy integration tools in combination. FIGS. 4 and 5 are based on publicly disclosed technologies for the automatic generation of taxonomy from structured information (e.g., database, XML, Java programs, etc.) and the semi-automatic generation of taxonomy from semi-structured information (e.g., html, XML) or unstructured information (e.g., text) by using text analysis techniques (e.g., IBM Research's Talent or GlossOnt). Additionally, there are publicly disclosed techniques for the manual construction of taxonomies by using software tools such as Stanford University's Protégé, and IBM's Snobase. There are also publicly disclosed software tools (e.g., Stanford University's PROMPT) for integrating multiple taxonomies created from various sources by using different techniques. Once the help information taxonomy is constructed, it replaces the publicly available help information taxonomy 35 such as illustrated in FIG. 3 and in the system architecture shown in FIG. 1. This new, customized help information taxonomy is used to update the metadata entries in the mapping database 30 shown in FIG. 6 and by the Composition Services 80 illustrated in FIGS. 12 and 14 in cases of implicit and explicit user help queries, respectively.

Several related example user scenarios are now provided to illustrate the use of the system 10 including the service provider's ability to invoke, on demand, additional services in response to performance metrics deficiencies or changing business requirements for help content.

In a first example user scenario, a sponsor 20 has elected to include found help in the provided help content for the sponsor's employees who are using Windows Me. The sponsor 20 and provider 16 negotiate a service level agreement based on the sponsor using the sponsor user interface 200 in FIG. 19 to specify the domain scope 133 of content included as Windows Me and the help content services 140 to include specific, found and general help. In this example, since the sponsor is a multinational corporation with a large employee base as potential users of the provider's system, the provider agrees to a high rate of selection of offered help content by users and a high rating of that content selected when users provide ratings via the End User Help Window User interface 40 shown in FIG. 2. The service provider 16, via the Service Provider user interface 160 shown in FIG. 20, decides to include only very recent content, e.g., nothing older than 1 year, via a data currency indication 174, even though this will increase the provider's expenses associated with the operation of the Discovery Service 27 (shown and described herein in connection with FIG. 10). The provider, via the entered subcontractor data fields 176 of the interface depicted in FIG. 20, also decides to engage only high quality help content providers based on their past performance, even though this will reduce the provider's projected profit on this contract in order to meet the sponsor's requirements for the service level agreement. The provider selects a publicly available taxonomy for help information 35 and decides not to invoke the optional but extra cost, for the provider, help information taxonomy construction service for this contract (shown and described herein with respect to FIGS. 4 and 5), via the entry fields 173 of the interface depicted in FIG. 20, in order to keep additional costs down and achieve an acceptable profit.

Figure 11:
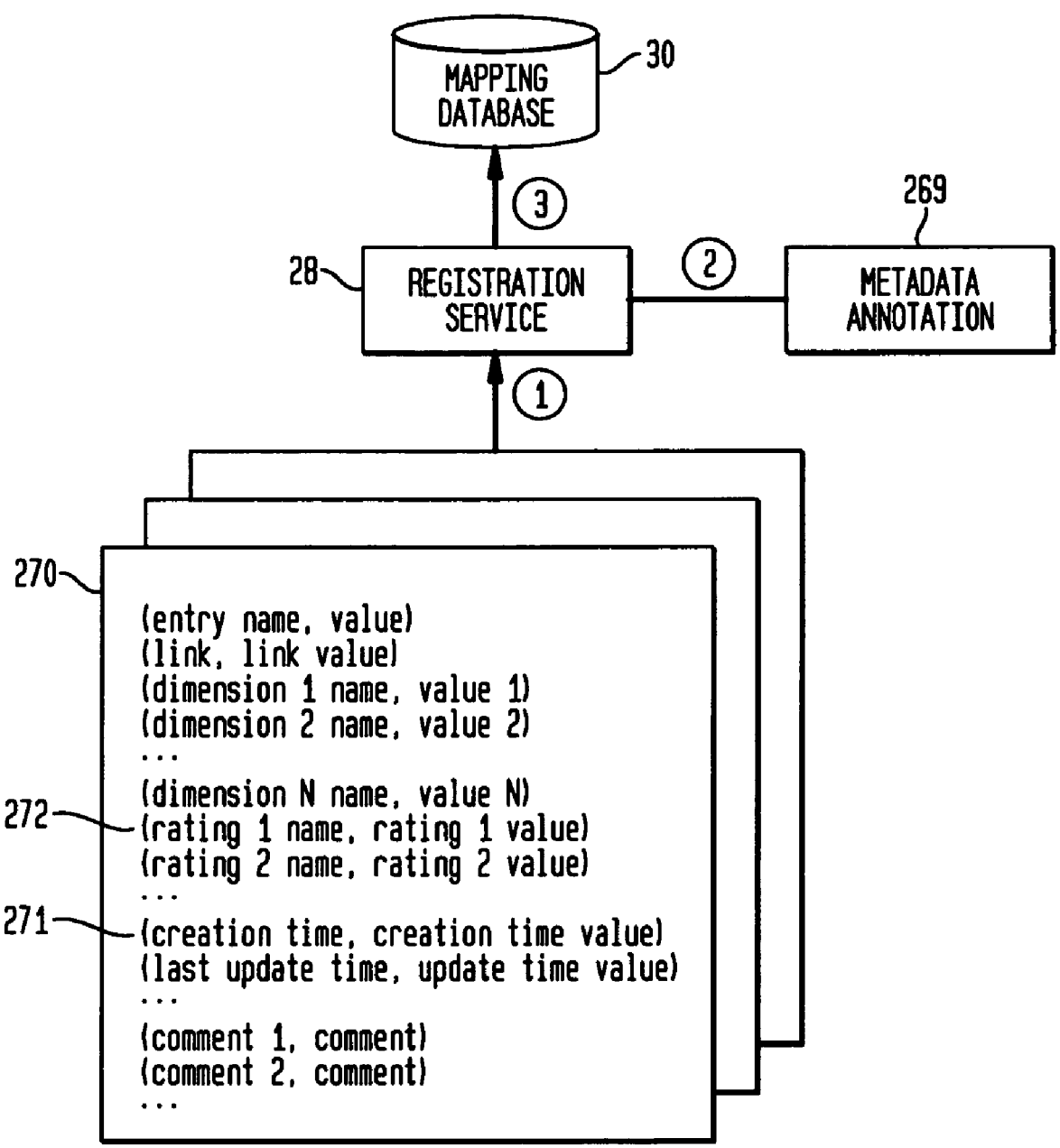
FIG. 11 is an example record and a schematic showing an example architecture of an example registration service which automatically registers discovered help information into the mapping database and also allows for manual registration.
Figure 18:
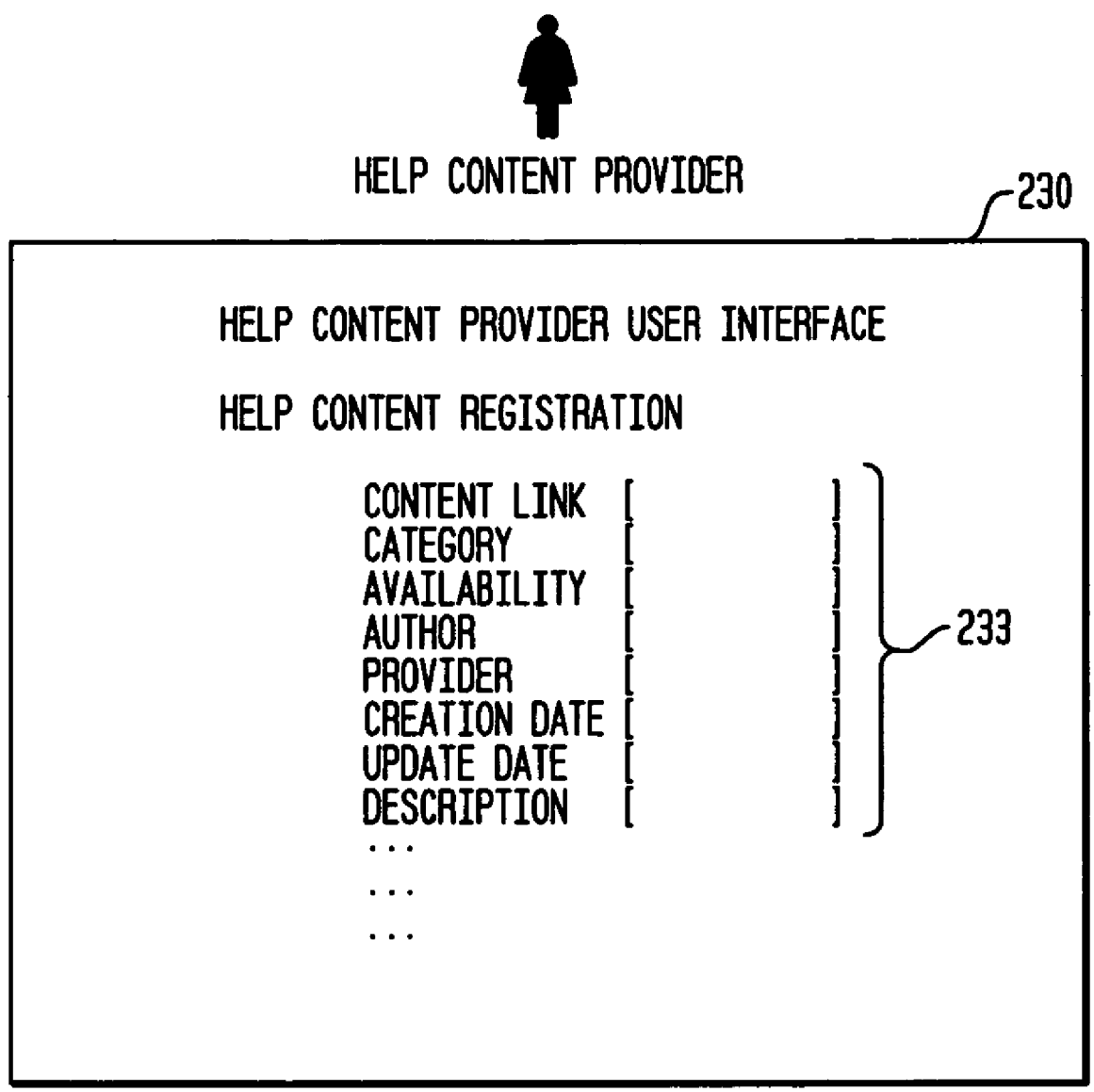
FIG. 18 is a diagram illustrating an example user interface where help content providers enter metadata describing their help content for storage in the mapping database.

As shown in FIG. 8, the service provider 16 invokes the Administration Service 99 which accesses the help information taxonomy 35 and provides it to the Discovery Service 27 (the details of which are shown in FIG. 10) along with the additional requirements on help content currency specified by the Provider on their interface 160 shown in FIG. 20. Then, the Registration Service 28 (the details of which are shown in FIG. 11), under the direction of the Administration Service, then automatically registers metadata associated with discovered relevant help information content into the mapping database 30 (the details of which are shown in FIG. 6). The Registration service 28 compares the metadata associated with the discovered help information content with the help information taxonomy to identify gaps in needed help content and notifies the help content providers 176 (designated by the service provider 16 via their interface 160 shown in FIG. 20) regarding needed content. The designated help content providers 176 then create the needed content or, in an alternative embodiment, license from the service provider various services such as Administration, Discovery, Registration, etc. in the system in order to perform their own discovery processes if they deem this to be more cost effective and quicker for them, rather than having to develop new help information while fulfilling their commitments to the provider. FIG. 18 is a diagram illustrating an example user interface 230 where help content providers enter metadata describing their help content for storage in the mapping database 30. As shown in FIG. 18, the help content provider user interface 230 comprises help content registration entry fields 233 including, but not limited to fields indicating: a particular content link, its category, content availability, content author, provider, creation date, update date, and help description.

In this first example user scenario, an end user, via his/her interface 40 shown in FIG. 2, submits an explicit query which is input for the Composition Service 80 (the details of which are shown and described in FIGS. 13 and 14). In this user scenario, the Composition Service 80 includes two sources of user context information—the Monitoring Service 85 (the details of which are shown in FIG. 17), which may be provided to the sponsor 20 by this provider and detects that the user's platform is actually a Windows XP, and the Query Service 60. It is understood that the Monitoring Service 85 may be provided to the sponsor at little or no cost. In this example embodiment, as shown in FIG. 13, the user query has specified a Windows Me operating system 163 but the Monitoring Service 85 communicates with the Composition Service 80 that, as a result of the use of a taxonomy generalization, the provided help content should include Windows and Windows XP 163' specific answers to be rendered to the end user via their interface 40. Thus, the Composition Service is adapted to generalize or specialize one or more entries in the context information input by using the hierarchical structural information of the help information taxonomy, and/or disambiguate one or more entries in the context information input by using the multi-dimensional structural information of the help information taxonomy.

In a second example user scenario, the same sponsor 20 has elected to include, via their interface 200 (shown and described with respect to FIG. 19), at a higher cost to the sponsor, the rating 92, user context 94 and implicit query 82 services for specific end-users, e.g., the sponsor's top technologists and executives, in order to obtain a commitment from the provider for a higher level of selection of provided help content. This level of commitment may be an even higher rating of selected content than that agreed upon as part of the service level agreement between the sponsor and the provider for the majority of the employees of the sponsor. In this embodiment, the end user need not submit an explicit query but, while under user control, the system 10 will automatically generate an implicit query based on the user's context 63 and render help content deemed most relevant. In this example, during the user's use of the Windows Me platform, the Composition service 80 has access to three different sources of user context information as shown in FIG. 12, i.e., user context 63, user profile context 66 and ratings context 67.

FIG. 15 illustrates the functions 192 performed by the Rating Service 92 which provides an output that goes beyond the collection of ratings for purposes of service level agreement compliance indicated in the first example user scenario to a closed loop system 195 in this embodiment, whereby the ratings are used as one source of user context information input to the Composition Service 80 when it queries the mapping database 30 for relevant help information to render to the end user.

FIG. 16 illustrates the functions 194 performed by the User Profile Service 94 which includes sources of information such as third party user profile information 140 as well as previous user help content selections to inform the Composition Service.

FIG. 17 illustrates the functions performed by the Monitor Service 85 that employs a monitoring agent 185 that collects the subject platform data as well as other user context and activity information as a result of performed activity monitoring 186. As shown, a help suggestion agent 182 guesses (by monitoring and analyzing the user activity) and suggests what help this user might need (e.g., general, introduction, how to, reference, FAQ, etc.)

In a third example user scenario, the same service provider 16 is at risk of losing future revenue from the same sponsor 20 because the help information service provided to the sponsor's end-user technologists and executives failed to meet agreed upon levels in terms of the rate of selection of provided help content and the ratings of the selected content. For this reason, the service provider 16 has decided, to invoke the Help Information Taxonomy Construction Service 70 (the details of which are shown and described in FIGS. 4 and 5). For instance, this additional Help Information Taxonomy Construction Service 70 may be invoked at little or no cost to the sponsor. The provider suspects that the publicly available help information taxonomy used in the first two scenarios is not fully reflective of the latest ways that sophisticated users categorize help information relative to operating systems, as indicated by some of the most recent discussions in newsgroups and for a regarding Windows.

More specifically, the taxonomy discovery services 71 shown in FIG. 5 access various sources of help information taxonomies 25 related to the subject matter of Windows platforms. These sources of help information taxonomies include various levels of structure (structured, e.g., Windows code examples, semi-structured, e.g., FAQ on Windows, unstructured, e.g., newsgroup discussions or blogs), and various locations (e.g. the Internet, intranet, personal workspace). After accessing the help information taxonomies 35, the discovery services 71 filter it and provide it to the taxonomy construction service as its input. The taxonomy construction service 70 shown in FIG. 4 implements data transformation 371, taxonomy editing 372 and taxonomy integration 373 functions and applies them to the input from the taxonomy discovery service 71 to build a customized help information taxonomy 35, which is the output of the service. Once the customized help information taxonomy is constructed, it is used in annotating metadata 270 about entries in the mapping database 30, which in turn are used by the Composition Service 80 (the details of which are shown and described in FIGS. 12 and 14) to respond more effectively to implicit and explicit user queries, thus improving the performance metrics regarding user selection and rating and enabling the service provider to meet their obligations under the service level agreement with the sponsor.

Those skilled in the art will recognize that the system's service oriented architecture 10 can be implemented using a number of different technologies. For example, XML (extensible Markup Language) and its related technologies may serve as a markup definition toolkit to create an information specification language for entries in the mapping database illustrated in FIG. 6 and the User Profile Database illustrated in FIG. 7. The Help Information Taxonomy 35 shown and described with respect to FIG. 3, may be specified in markup languages such as XML, XSD (XML Schema Definition Language), RDF (Resource Description Framework, an XML-based language recommended by W3C for semantic web markup, is preferred because it can express various relationships among terms), OWL (Web Ontology Language, an extension of RDF also recommended W3C), or Topic Map. The Composition Service 80 for explicit user queries, as illustrated in FIG. 14, and the Composition Service 80 for implicit user queries, illustrated in FIG. 12, may use XPath and/or XQuery to interrogate the mapping database 30 illustrated in FIG. 6 to identify relevant help content. In general, the inputs and outputs of the system's services may be implemented as web services specified in XML messages transported on SOAP (Simple Object Access Protocol) on top of HTTP, or like network-based communications protocol.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what I claim as new, and desire to secure by Letters Patent is:

1. A system for providing integrated help information to users of computer programs and network-based services, said system comprising:
    a means for receiving from a sponsor entity specification of performance criteria associated with providing a particular help content service at a requested performance level for said users;
    a means enabling a service provider entity to specify service provision parameters to provide said help content service for users according to said requested performance level for said users;
    a means for mining available help information resources for relevant help information, extracting properties of a discovered help information, and, organizing and categorizing said discovered help information according to a help information taxonomy;
    a memory storage means for storing metadata entries associated with the organized and categorized discovered help content;
    a means for automatically registering the discovered help content as said metadata entries in said memory storage means, where said discovered help excludes predetermined decisions made by a human that are subsequently automatically executed;
    end-user interface means adapted to receive dynamically specified user help queries submitted by an end-user;
    a means for monitoring and collecting user context information relating to activities of users of the computer programs or services, said collected information including system configuration information of user devices;
    means for comparing collected user context information with help information taxonomies and composing a context sensitive search query based on said specified user help queries and the monitored and collected information in response to a specified user help query;
    means for executing the composed context sensitive search query against said memory storage means comprising said metadata entries associated with the help content, and utilizing the associated metadata to access help information comprising contextual help resources identified by the metadata;
    wherein said end-user interface means receives the help information identified by the metadata and renders one or more categorized links to enable end-user access to said contextual help resources; and
    means for collecting help content rating from said end user for use in responding to future help queries.

2. The system for providing integrated help information as claimed in claim 1, wherein said categorized links to contextual help resources includes one or more of specific help, found help, and general help categories, or any combination thereof.

3. The system for providing integrated help information as claimed in claim 2, wherein said categorized links to specific contextual help resources includes help content that specifically addresses questions expected when using a particular computer program and other help content pages registered to said memory storage means via said registering means.

4. The system for providing integrated help information as claimed in claim 2, wherein said categorized links to found contextual help resources includes links dynamically mapped from an output of one or more transformation and text analytics software tools, which analyze one or more help information resources having content comprising forums, newsgroups, blogs, and frequently asked questions lists.

5. The system for providing integrated help information as claimed in claim 2, wherein said categorized links to general contextual help resources include links to comprehensive help systems including those used for corporate intranets or provided by the software vendors for the computer programs.

6. The system for providing integrated help information as claimed in claim 1, wherein said means for mining available help information resources comprises means for navigating from among one or more information spaces comprising one or more networks of computers to discover relevant help information.

7. The system for providing integrated help information as claimed in claim 1, wherein said memory storage means for storing said metadata entries comprises a database for providing one or more indices to help information residing in multitude of help information sources in one or more networks of computers.

8. The system for providing integrated help information as claimed in claim 1, wherein said means for automatically registering the metadata associated with the discovered help content in said memory storage means further comprises means for recording and updating one or more metadata entries of the help information in the memory storage means.

9. The system for providing integrated help information as claimed in claim 1, wherein said registration means assigns metadata to discovered help content according to help information taxonomies provided by the system, said means for composing an context sensitive search query comprising means for comparing user context information with the help information taxonomies provided.

10. The system for providing integrated help information as claimed in claim 9, wherein said means for comparing user context information with the help information taxonomies provided further composes one or more on-demand, context-sensitive search query responses after executing said search queries against entries in the memory storage means.

11. The system for providing integrated help information as claimed in claim 10, further comprising a taxonomy construction means for providing integrated structured help information taxonomies for use in composing said on-demand context sensitive search query.

12. The system for providing integrated help information as claimed in claim 11, wherein said taxonomy construction means includes means implementing one or more software transformation tools for automatically deriving structural information of discovered help information from structured content.

13. The system for providing integrated help information as claimed in claim 11, wherein said taxonomy construction means further includes means implementing one or more software text analysis tools for semi-automatically deriving structural information of discovered help information from semi-structured or unstructured content.

14. The system for providing integrated help information as claimed in claim 11, wherein said taxonomy construction means further includes means implementing taxonomy editing software tool that enables a user to manually derive structural information of discovered help information.

15. A method for providing integrated help information to users of computer programs and network-based services comprising:

receiving from a sponsor entity specification of performance criteria associated with providing a particular help content service at a requested performance level for said users;

enabling a service provider entity to specify service provision parameters to provide said help content service for users according to said requested performance level for said users;

during a help information build time, mining available help information resources for relevant help information, extracting properties of a discovered help information, and, organizing and categorizing said discovered help information according to a help information taxonomy;

storing metadata entries associated with the organized and categorized discovered help content in a memory storage means, where said discovery help excludes predetermined decisions made by a human that are subsequently automatically executed;

automatically registering the discovered help content as said metadata entries in said memory storage means; and, during a help information run time, receiving dynamically specified user help queries submitted by an end-user;

monitoring and collecting user context information relating to activities of users of the computer programs or services, said collected information including system configuration information of user devices;

comparing collected user context information with help information taxonomies and composing a context sensitive search query based on said specified user help queries and the monitored and collected information in response to a specified user help query;

executing the composed context sensitive search query against said memory storage means comprising said metadata entries associated with the help content, and, utilizing the associated metadata to access help information comprising contextual help resources identified by the metadata, rendering the help information identified by the metadata as one or more categorized links on an end-user interface device, to enable end-user access to said contextual help resources, and collecting help content rating, from said end user for use in responding to future help queries.

16. The method as claimed in claim 15, wherein said categorized links to contextual help resources includes one or more of specific help, found help, and general help categories, or any combination thereof.

17. The method as claimed in claim 16, further including the step of providing categorized links to specific contextual help resources including help content that specifically addresses questions expected when using a particular computer program and, other help content pages for registration to said memory storage means.

18. The method as claimed in claim 16, further including the step of providing categorized links to found contextual help resources including links dynamically mapped from an output of one or more transformation and text analytics software tools, which analyze one or more help information resources having content comprising forums, newsgroups, blogs, and frequently asked questions lists.

19. The method as claimed in claim 16, further including the step of providing categorized links to general contextual help resources including links to comprehensive help systems including those used for corporate intranets or provided by the software vendors for the computer programs.

20. The method as claimed in claim 15, wherein said mining step a) includes navigating from among one or more information spaces comprising one or more networks of computers to discover relevant help information.

21. The method as claimed in claim 15, wherein said automatically registering step further comprises the steps of recording and updating one or more metadata entries of the help information in the memory storage means.

22. The method as claimed in claim 15, wherein said automatically registering step further includes a step of assigning metadata to discovered help content according to help information taxonomies provided by the system, said composing step e) further including the step of comparing user context information with the help information taxonomies provided.

23. The method as claimed in claim 22, wherein said step of comparing user context information with the help information taxonomies provided further includes composing one or more on-demand, context-sensitive search query responses after executing said search queries against entries in the memory storage means.

24. The method as claimed in claim 23, further comprising a step of constructing one or more structured help information taxonomies during said run-time for use in composing said on-demand context sensitive search query.

25. The method as claimed in claim 24, wherein said step of constructing one or more structured help information taxonomies includes implementing one or more software transformation tools for automatically deriving structural information of discovered help information from structured content.

26. The method as claimed in claim 24, wherein said step of constructing one or more structured help information taxonomies includes implementing one or more software text analysis tools for semi-automatically deriving structural information of discovered help information from semi-structured or unstructured content.

27. The method as claimed in claim 24, wherein said step of constructing one or more structured help information taxonomies includes implementing taxonomy editing software tool that enables a user to manually derive structural information of discovered help information.

28. A system for providing an on-demand, context-sensitive, integrated help information service to end-users of computer programs and services, said system comprising:

a means for receiving from a sponsor entity specification of performance criteria associated with providing a particular help content service at a requested performance level for said end-users, a means enabling a service provider entity to specify service provision parameters to provide said help content service for end-users according to said requested performance level;

a means for mining available help information resources for relevant help information, extracting properties of a discovered help information, and, organizing and categorizing said discovered help information according to a help information taxonomy;

a means for navigating help information sources comprising data in structured formats, semi-structured formats and unstructured formats in compliance with said initial service provision parameters;

a memory storage means for storing metadata associated with the organized and categorized discovered help content and providing one or more indices of help information residing in multitude of help information sources in one or more networks of computers;

a means for assigning said metadata to said discovered help content and registering said metadata associated with discovered help information resources in said memory storage means, where said discovered help excludes predetermined decisions made by a human that are subsequently automatically executed;

end-user interface means adapted to receive dynamically specified user help queries submitted by an end-user;

a means for monitoring and collecting user context information relating to activities of users of the computer programs or services, said collected information including system configuration information of end-user devices;

a means for receiving dynamically specified user help queries submitted by said end-users associated with said sponsor entity;

a means for comparing collected user context information with help information taxonomies and composing an on-demand, context sensitive user search query based on said specified user help queries and the monitored and collected information;

a means for executing the composed context sensitive user search query against said metadata stored in said memory storage means associated with the help content provided, and utilizing the associated metadata to access help information comprising contextual help resources identified by the metadata, wherein said end-user interface device receives the help information identified by the metadata and renders one or more categorized links to enable end-user access to said contextual help resources; and means for collecting help content rating from said end user for use in responding to future help queries.

29. The system according to claim 28, wherein said help information taxonomy provides one or more controlled vocabularies for help information and specifies one or more hierarchical relationships among terms defined in said one or more controlled vocabularies in one or more dimensions or domains of interest in characterizing one or more aspects of said computer programs.

30. The system according to claim 28, further comprising a user profile storage device for receiving and storing profile information of one or more individual end-users of the said computer programs and services.

31. The system according to claim 28, further comprising help taxonomy construction means for analyzing and extracting one or more properties of discovered help information structures and organizing and categorizing the discovered help information structures in the help information taxonomy.

32. The system for providing integrated help information as claimed in claim 28, wherein said means for automatically registering the metadata associated with the discovered help content in said memory storage means further comprises means for recording and updating one or more metadata entries of the help information in the memory storage means.

33. The system for providing integrated help information as claimed in claim 30, further comprising a user profile service means for managing user profile information input from one or more sources comprising: users of said computer programs or services, or user profile information from one or more third-party information providers, and storing said user profile information in a user profile storage device.

34. The system for providing integrated help information as claimed in claim 33, further comprising a ratings service means for collecting rating values indicating relevancy of provided help content from one or more users of the computer program and, managing and updating one or more rating values of one or more metadata entries in said memory storage means.

35. The system for providing integrated help information as claimed in claim 33, further comprising means enabling a system administrator of said system to manage the memory storage means, the help information taxonomy and the user profile data storage means by specifying one or more metadata and one or more policies and enforcing them.

36. The system for providing integrated help information as claimed in claim 34, wherein said means for monitoring and collecting user context information includes means for communicating collected information to either said ratings service means or user profile service means, or both, in the system for providing context-sensitive help information.

37. The system for providing integrated help information as claimed in claim 34, wherein said means for composing one or more on-demand, context-sensitive search queries includes combining context information from said monitoring means and from either said ratings service means or user profile service means, or both, in the system, and generating said context sensitive user query based obtaining one or more search results by said executing means.

38. The system as claimed in claim 28, wherein said sponsor entity comprises one or more of: an individual user, a sponsoring agency or a corporation enabled to contract with said help service providers to only receive and pay by use for selected categories of contextual help content including specific help, found help or general help categories.

39. The system as claimed in claim 34, further comprising means enabling said sponsor entity and help service provider entities to negotiate a service level agreement based on aggregate user relevancy ratings for provided help links.

40. The system as claimed in claim 39, further comprising means enabling discovery and development of additional help content when the existing service provision parameters associated with the specified performance criteria are not being achieved, or specified performance parameters are modified by mutual agreement between the sponsor entity and the service provider entity in a negotiated service level agreement.

41. The system as claimed in claim 28, wherein the help information sources comprising content stored in structured formats comprising databases or spreadsheets, in semi-structured formats comprising XML (eXtensible Markup Language) and HTML (HyperText Markup Language) program, and, in unstructured formats comprising text.

42. The system as claimed in claim 28, wherein the help information sources include content stored in one or more data formats comprising ASCII text, RTF, Word format, or PDF included in storage media comprising one or more of: a database, disk, file, CD, or DVD.

43. The system as claimed in claim 28, wherein the help information sources include text, still image, video, and audio data content.

44. The system as claimed in claim 28, further comprising communications means for delivering content from the help information sources according to push, RSS (Real Simple Syndication), pull, or publish and subscribe content delivery protocols.

45. The system as claimed in claim 28, wherein said communications means for delivering content from the help information sources include one or more network protocols comprising HTTP, FTP, SOAP, or MQ.

46. The system as claimed in claim 28, wherein the help information sources include content stored in one or more information spaces comprising including, but not limited to, internet, intranet, extranet, public databases, private databases, commercial database, or personal workspaces or user desktop computer devices.

47. The system as claimed in claim 28, wherein the help information sources include content from one or more third-party sources comprising indices of public, private or commercial search engine databases, and includes content not available at a time the computer program in use by said end-user was developed.

48. The system as claimed in claim 37, where the context information provided to the composing means comprises one or more of user context which provided by said monitoring means, query context, a ratings context provided by said rating service means; and user profile context provided by said user profile service means.

49. The system as claimed in claim 37, further comprising a service-oriented architecture wherein each of said composing means, said means for receiving dynamically specified user help queries, said ratings service means, said user profile service means, said means for automatically registering and assigning, said means for navigating help information, and said help taxonomy construction means are implemented as software services in one or more networks of computers.

50. The system as claimed in claim 49, wherein said service-oriented architecture comprises one of Web services on the internet, or communicating messages in XML format transported on the SOAP protocol on top of HTTP, or both.

* * * * *